(12) United States Patent
Seyama

(10) Patent No.: US 9,648,574 B2
(45) Date of Patent: May 9, 2017

(54) RECEIVING DEVICE, RECEIVING METHOD, AND RADIO COMMUNICATION SYSTEM

(71) Applicant: FUJITSU LIMITED, Kawasaki-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 14/803,845

(22) Filed: Jul. 20, 2015

(65) Prior Publication Data

US 2016/0044646 A1 Feb. 11, 2016

(30) Foreign Application Priority Data

Aug. 5, 2014 (JP) .................................. 2014-159313

(51) Int. Cl.
*H04W 4/00* (2009.01)
*H04W 56/00* (2009.01)
*H04L 5/00* (2006.01)

(52) U.S. Cl.
CPC ........... *H04W 56/001* (2013.01); *H04L 5/005* (2013.01); *H04L 5/0023* (2013.01);
(Continued)

(58) Field of Classification Search
None
See application file for complete search history.

(56) References Cited

U.S. PATENT DOCUMENTS

2003/0058823 A1  3/2003 Nishimura
2003/0138056 A1*  7/2003 Uesugi .................. H04L 1/005
                                                  375/262
(Continued)

FOREIGN PATENT DOCUMENTS

JP        2003-110460 A      4/2003
JP        2004-297444 A     10/2004
(Continued)

OTHER PUBLICATIONS

Henao et al., "Advanced receiver signal processing techniques: evaluation and characterization", Advanced Radio InTerface Technologies for 4G SysTems ARTIST4G, Jan. 21, 2011, pp. 1-125.
(Continued)

*Primary Examiner* — Minh-Trang Nguyen
(74) *Attorney, Agent, or Firm* — Arent Fox LLP

(57) ABSTRACT

A receiving device includes a first processing unit configured to execute a first demodulation process on a second signal transmitted in a second radio area different from a first radio area in which a first signal as a desired signal is transmitted; a first estimation unit configured to execute a first estimation process of estimating a channel for the second radio area based on an execution result of the first demodulation process; and a second processing unit configured to execute a cancellation process of cancelling a component from a received signal based on the estimated channel, the component being attributed to the second signal transmitted in the second radio area, wherein the receiving device executes a second demodulation process on the desired signal based on an execution result of the cancellation process.

15 Claims, 14 Drawing Sheets

(52) U.S. Cl.
CPC .......... *H04L 5/0032* (2013.01); *H04L 5/0073* (2013.01); *H04L 5/0091* (2013.01)

(56) References Cited

U.S. PATENT DOCUMENTS

| | | |
|---|---|---|
| 2009/0310707 A1 | 12/2009 | Cheng et al. |
| 2009/0310715 A1 | 12/2009 | Cairns et al. |
| 2011/0075770 A1 | 3/2011 | Seyama |
| 2014/0357255 A1* | 12/2014 | Jonsson ................ H04W 52/16 455/422.1 |

FOREIGN PATENT DOCUMENTS

| | | |
|---|---|---|
| JP | 2011-77940 A | 4/2011 |
| JP | 5326976 B2 | 10/2013 |
| JP | 2013-240102 A | 11/2013 |

OTHER PUBLICATIONS

Baojin et al., "Interface Cancellation for HetNet Deployment in 3GPP LTE-Advanced Rel-11", Proceedings of IEEE Vehicular Technology Conference, Jun. 2013, pp. 1-5.

* cited by examiner

RECEIVING DEVICE, RECEIVING METHOD, AND RADIO COMMUNICATION SYSTEM

CROSS-REFERENCE TO RELATED APPLICATION

This application is based upon and claims the benefit of priority of the prior Japanese Patent Application No. 2014-159313, filed on Aug. 5, 2014, the entire contents of which are incorporated herein by reference.

FIELD

The embodiments discussed herein are related to a receiving device, a receiving method, and a radio communication system.

BACKGROUND

A wireless communication system including a base station and a mobile station is known (see, for example, Japanese Laid-open Patent Publication Nos. 2004-297444, 2003-110460, and 2013-240102, Li Baojin and 2 others, "Interference Cancellation for HetNet Deployment in 3GPP LTE-Advanced Rel-11", *Proceedings of IEEE Vehicular Technology Conference, IEEE*, pages 1 to 5, June 2013, and Henao J. C. and 15 others, "Advanced Receiver Signal Processing Techniques: Evaluation and Characterization", *Advanced Radio Interface Technologies for 4G Systems* (retrieved from <URL: https://ict-artist4g.eu/projet/workpackages/wp2/deliverables/d2.2/final/d2.2-1/at_download/file> on the Internet on Jul. 15, 2014). The mobile station includes a receiving device that receives a radio signal from the base station. Further, the base station includes a receiving device that receives a radio signal from the mobile station. The mobile station performs radio communication with the base station in a radio area formed by the base station.

For example, in Release 10 of LTE specified by 3GPP, inter-cell interference control described as eICIC is proposed. 3GPP is an abbreviation for Third Generation Partnership Project. LTE is an abbreviation for Long Term Evolution. Further, eICIC is an abbreviation for enhanced inter-cell interference coordination.

As illustrated in FIG. 1, for example, the inter-cell interference control is assumed to be executed when a pico cell C2 is formed by a pico base station 92 inside a macro cell C1 formed by a macro base station 91. In this case, there is likely to be an increase in interference due to a radio signal transmitted in the macro cell C1 for a radio signal received from the pico base station 92 by a mobile station 93 located inside the pico cell C2. Hereinafter, the radio signal received from the pico base station 92 by the mobile station 93 located inside the pico cell C2 will also be described as a desired signal. Further, the radio signal transmitted in the macro cell C1 will also be described as an undesired signal or interference waves.

In the inter-cell interference control, therefore, a period P1 for transmitting an ABS in the macro cell C1 is provided, and data is transmitted to the mobile station 93 in the pico cell C2 during the period P1, as illustrated in FIG. 2. ABS is an abbreviation for almost blank subframe.

The ABS includes a reference signal (CRS, for example), a synchronization signal (PSS and SSS, for example), and a broadcast signal. CRS is an abbreviation for cell-specific reference signal. PSS is an abbreviation for primary synchronization signal. SSS is an abbreviation for secondary synchronization signal. The broadcast signal is transmitted via a physical broadcast channel (PBCH), for example. The ABS is a subframe in which a radio resource is allocated only to the reference signal, the synchronization signal, and the broadcast signal.

According to this configuration, the influence of the interference waves on the reception quality of the mobile station 93 is reduced in the period P1. Consequently, the reception quality of the mobile station 93 is enhanced. Accordingly, the area of coverage of the mobile station 93 by the pico cell C2 is expanded. The expansion of this area is also described as cell range expansion (CRE).

Meanwhile, the reference signal, the synchronization signal, and the broadcast signal included in the ABS degrade the reception quality of the mobile station 93. In Release 11 of LTE specified by 3GPP, therefore, feICIC is proposed. Herein, feICIC is an abbreviation for further enhanced ICIC.

In feICIC, information concerning an interference cell is transmitted to a mobile station. The interference cell is a cell in which a radio signal causing interference waves is transmitted. The information concerning the interference cell is also described as CRS assistance information. Further, in feICIC, the reference signal, the synchronization signal, and the broadcast signal included in the ABS transmitted in a macro cell are cancelled in a reception process by the mobile station. Thereby, the reception quality of the mobile station is enhanced. Accordingly, the area of coverage of the mobile station by a pico cell is expanded.

A receiving device that cancels the reference signal, the synchronization signal, and the broadcast signal included in the ABS transmitted in the macro cell is also described as an interference cancelling (IC) receiving device. Cancellation of the reference signal, cancellation of the synchronization signal, and cancellation of the broadcast signal are described as CRS-IC, PSS/SSS-IC, and PBCH-IC, respectively.

An overview of an IC technique will be described as an example. A received signal in a resource element (RE) in the k-th subcarrier and the l-th symbol time in OFDM is expressed by mathematical formula 1 described below. OFDM is an abbreviation for orthogonal frequency-division multiplexing. The l-th symbol time is a time corresponding to the l-th OFDM symbol along the time axis.

$$y(k, l) = H(k, l)V(k, l)x(k, l) + \sum_{i=1}^{N_{cell}} H_i(k, l)x_i(k, l) + n(k, l) \quad (1)$$

Herein, y(k, l) represents the received signal, and corresponds to an $N_r \times 1$ vector. $N_r$ represents the number of receiving antennas used by the mobile station. H(k, l) represents a channel between the base station and the mobile station in a serving cell, and corresponds to an $N_r \times N_t$ matrix. The serving cell is a radio area formed by the base station and providing a radio resource used by the mobile station to transmit and receive data to and from the base station. $N_t$ represents the number of transmitting antennas used by the base station in the serving cell.

V(k, l) represents an $N_t \times N_{stream}$ transmitting precoding matrix in the serving cell. $N_{stream}$ represents the number of streams included in a desired signal. The desired signal is a radio signal transmitted to the mobile station by the base station in the serving cell. The desired signal is also described as a transmitted signal. Further, x(k, l) represents the desired signal, and corresponds to an $N_{stream} \times 1$ vector.

$N_{cell}$ represents the number of interference cells. The interference cells are radio areas different from the serving cell. $H_i(k, l)$ represents a channel between the base station and the mobile station in the i-th interference cell, and corresponds to an $N_r \times N_{t,i}$ matrix. $N_{t,i}$ represents the number of transmitting antennas used by the base station in the i-th interference cell.

Further, $x_i(k, l)$ represents an undesired signal transmitted in the i-th interference cell, and corresponds to an $N_{t,i} \times 1$ vector. The undesired signal is the reference signal, the synchronization signal, or the broadcast signal, for example. Further, $n(k, l)$ represents AWGN, and corresponds to an $N_r \times 1$ vector. AWGN is an abbreviation for additive white Gaussian noise.

The mobile station estimates a channel $H_{e,i}$ between the mobile station and the base station in the i-th interference cell. The channel between the mobile station and the base station in the interference cell is also described as an interference channel. As indicated in mathematical formula 2 described below, the mobile station subtracts a signal obtained by multiplying the undesired signal $x_i$ by the estimated interference channel $H_{e,i}$ from the received signal y, to thereby cancel a component of the received signal attributed to the undesired signal transmitted in the interference cell. The signal obtained by multiplying the undesired signal $x_i$ by the estimated interference channel $H_{e,i}$ is also described as a replica signal of the undesired signal.

$$y_{PC}(k, l) = y(k, l) - \sum_{i=1}^{N_{cell}} H_{e,i}(k, l) x_i(k, l) \quad (2)$$

Herein, $y_{PC}$ represents the signal obtained by cancelling the component of the received signal attributed to the undesired signal transmitted in the interference cell. The mobile station performs a reception process (such as estimation of the channel in the serving cell, demodulation of the received signal, and error correction decoding on the received signal, for example) based on the received signal $y_{PC}$ subjected to the cancellation.

SUMMARY

According to an aspect of the invention, a receiving device includes a first processing unit configured to execute a first demodulation process on a second signal transmitted in a second radio area different from a first radio area in which a first signal as a desired signal is transmitted; a first estimation unit configured to execute a first estimation process of estimating a channel for the second radio area based on an execution result of the first demodulation process; and a second processing unit configured to execute a cancellation process of cancelling a component from a received signal based on the estimated channel, the component being attributed to the second signal transmitted in the second radio area, wherein the receiving device executes a second demodulation process on the desired signal based on an execution result of the cancellation process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
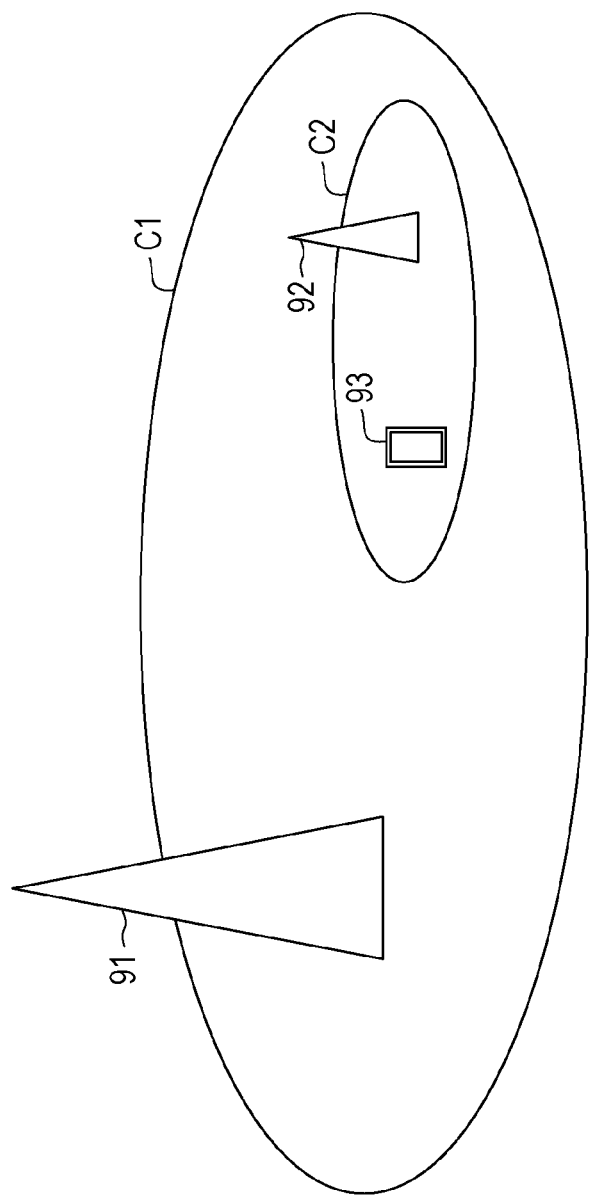
FIG. 1 is an explanatory diagram illustrating an example of a radio communication system.
Figure 2:
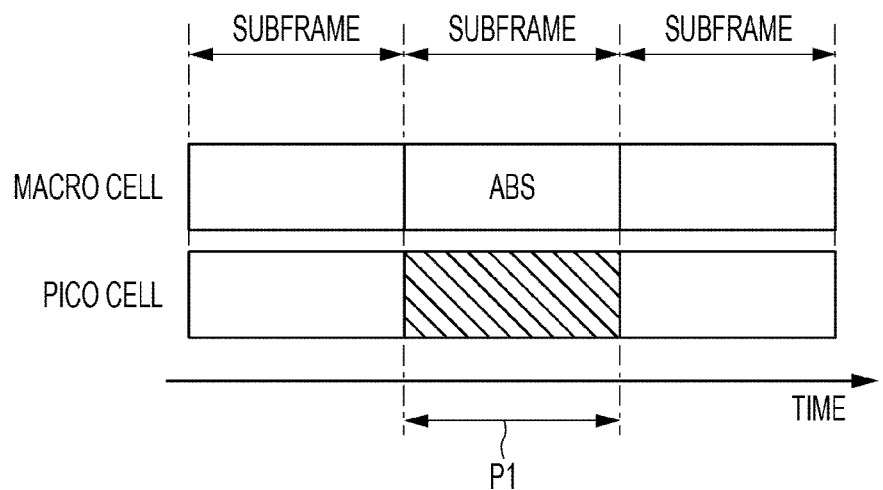
FIG. 2 is an explanatory diagram illustrating an example of eICIC.

Meanwhile, the estimated value of the interference channel may include an estimation error. When the mobile station estimates the interference channel, the estimation error tends to be increased as the reception strength of the radio signal transmitted in the interference cell falls below the reception strength of the radio signal transmitted in the serving cell.

For example, the reception strength of the radio signal transmitted in the interference cell tends to be reduced by fading caused by the Doppler effect or frequency selective fading. Further, for example, the reception strength of the radio signal transmitted in the serving cell tends to be increased as the mobile station in the pico cell as the serving cell approaches the base station in the serving cell. In such a case, the reception strength of the radio signal transmitted in the interference cell is relatively lower than the reception strength of the radio signal transmitted in the serving cell, and thus the estimation error included in the estimated value of the interference channel tends to be increased.

The component of the received signal attributed to the undesired signal transmitted in the interference cell may fail to be cancelled with sufficiently high accuracy owing to the estimation error included in the estimated value of the interference channel. The greater the estimation error is, the more likely the component included in the received signal and attributed to the undesired signal transmitted in the interference cell is to remain in the received signal subjected to the cancellation.

For ease of description, it is assumed herein that the number of interference cells, the number of transmitting antennas, and the number of receiving antennas are each 1. In this case, the received signal is expressed by the following mathematical formula 3.

$$y = hx + h_1 x_1 + n \quad (3)$$

As indicated in the following mathematical formula 4, an estimated value $h_{e,1}$ of the interference channel is expressed by the sum of a true value $h_1$ of the interference channel and an estimation error m.

$$h_{e,1} = h_1 + m \quad (4)$$

Accordingly, a signal obtained by subtracting a replica signal $h_{e,1} x_1$ from the received signal y is expressed by the following mathematical formula 5.

$$y - h_{e,1} x_1 = hx + h_1 x_1 + n - (h_1 + m) x_1 = hx - mx_1 + n \quad (5)$$

A component $mx_1$ included in the received signal and attributed to an undesired signal $x_1$ transmitted in the interference cell thus remains in the signal obtained by subtracting the replica signal $h_{e,1} x_1$ from the received signal y. Consequently, the reception quality of the desired signal tends to deteriorate.

In an aspect, an object of the embodiments is to enhance the reception quality of the desired signal.

Embodiments will be described below with reference to the drawings. However, the embodiments described below are illustrative. Therefore, there is no exclusion of the possibility that various modifications or techniques not specified below be applied to embodiments. In the drawings referred to in the following embodiments, parts designated by the same reference numerals denote identical or similar parts, unless alterations or modifications are specified.

First Embodiment

Configuration

Figure 3:
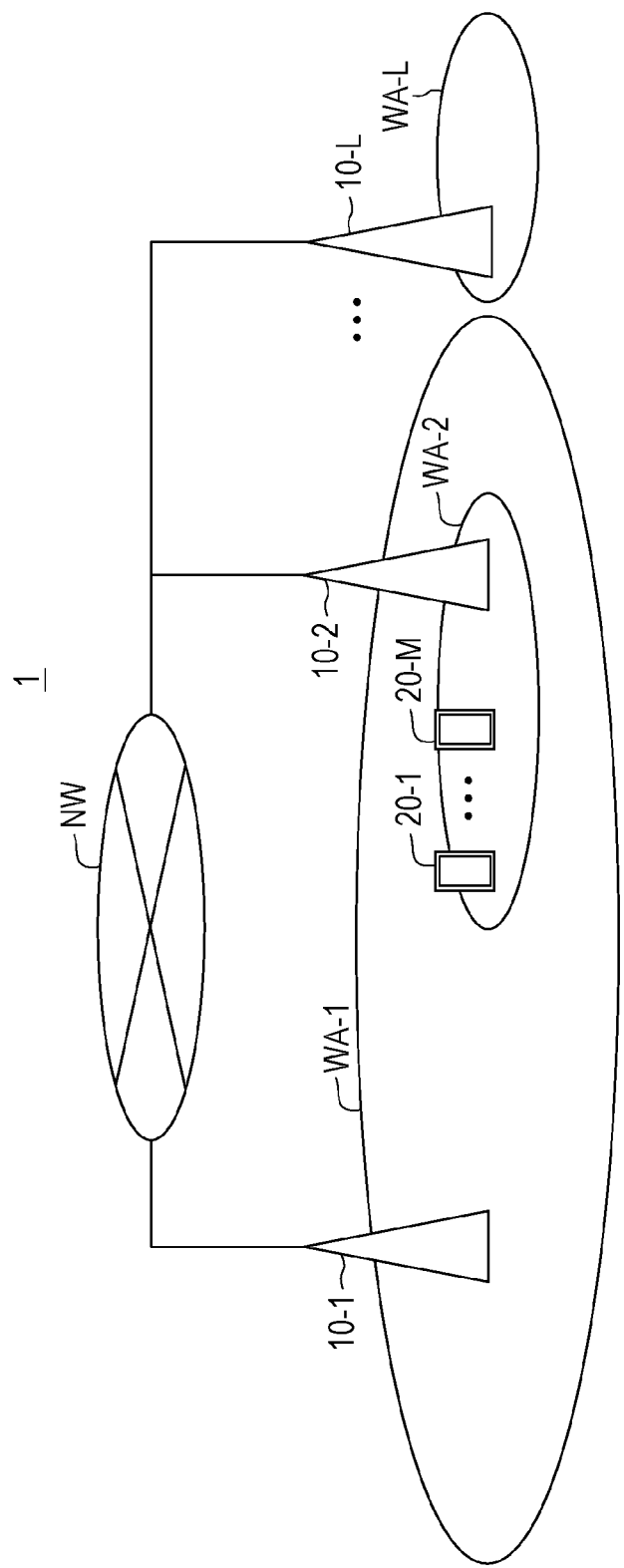
FIG. 3 is a block diagram illustrating a configuration example of a radio communication system according to a first embodiment.

As illustrated in FIG. 3, a radio communication system 1 according to a first embodiment includes the L number of base stations 10-1 to 10-L and the M number of mobile stations 20-1 to 20-M. L represents an integer equal to or greater than 2. M represents an integer equal to or greater than 1.

Hereinafter, a base station 10-$u$ will also be described as a base station 10 where distinction is unnecessary. Herein, u represents an integer ranging from 1 to L. Similarly, a mobile station 20-$v$ will also be described as a mobile station 20 where distinction is unnecessary. Herein, v represents an integer ranging from 1 to M. The base station 10 is an example of a transmitting device. The mobile station 20 is an example of a receiving device.

For ease of description, an example will be described in which the number of transmitting antennas in each base station 10 and the number of receiving antennas in each mobile station 20 are each 1. The number of transmitting antennas in each base station 10 and the number of receiving antennas in each mobile station 20 may each be 2 or more.

In the radio communication system 1, the base station 10 and the mobile station 20 perform radio communication with each other in accordance with a predetermined radio communication system. The radio communication system is an LTE system, for example. LTE is an abbreviation for Long Term Evolution. The radio communication system may be a system different from the LTE system (a system such as LTE-Advanced or WiMAX, for example). WiMAX is an abbreviation for Worldwide Interoperability for Microwave Access.

In the present example, the base station 10-$u$ forms a radio area WA-u. The radio area WA-u will also be described as a radio area WA where distinction is unnecessary. Each base station 10 may form multiple radio areas. The radio area WA may also be described as a coverage area or a communication area. For example, the radio area WA may be described as a cell, such as a macro cell, a micro cell, a nano cell, a pico cell, a femto cell, a home cell, a small cell, or a sector cell. Each base station 10 performs radio communication with the mobile station 20 located inside the radio area WA formed by the base station 10.

Specifically, each base station 10 provides a radio resource in the radio area WA formed by the base station 10. In the present example, the radio resource is identified by time and frequency. Each base station 10 communicates with the mobile station 20 located inside the radio area WA formed by the base station 10 by using the radio resource provided in the radio area WA. Each base station 10 may be an access point, an evolved Node B (eNB) or a Node B (NB).

In the present example, the maximum value of transmission power of the radio signal is greater in the base station 10-1 than in the base station 10-2. The base station 10-1 is therefore capable of forming a radio area WA-1 larger than a radio area WA-2 formed by the base station 10-2. In the present example, the base station 10-1 will also be described as a macro base station, and the base station 10-2 will also be described as a small base station. The small base station is a femto base station, a macro base station, a micro base station, a nano base station, a pico base station, or a home base station, for example.

In the present example, the small base station 10-2 is disposed inside the radio area WA-1 formed by the macro base station 10-1. Further, the radio area WA-2 formed by the small base station 10-2 is located inside the radio area WA-1 formed by the macro base station 10-1. The radio area WA-1 is an example of a second radio area. The radio area WA-1 is also described as a macro cell. The radio area WA-2 is an example of a first radio area. The radio area WA-2 is also described as a micro cell.

In the present example, each of the mobile stations 20-1 to 20-M is located inside the radio area WA-2 formed by the small base station 10-2.

Further, in the present example, each base station 10 is coupled to a communication network (a core network, for example) NW via a communication line to be communicable by wire. Each base station 10 may be coupled to the communication network NW to be communicable wirelessly. An interface between the base station 10 and the communication network NW may also be described as an S1 interface. Further, an interface between the base stations 10 may also be described as an X2 interface.

A part of the radio communication system 1 closer to the communication network NW (that is, higher) than the base stations 10 may also be described as an EPC. EPC is an abbreviation for Evolved Packet Core. A part of the radio communication system 1 formed by the base stations 10 may also be described as an E-UTRAN. E-UTRAN is an abbreviation for Evolved Universal Terrestrial Radio Access Network.

The mobile station 20 performs radio communication with the base station 10 forming the radio area WA in which the mobile station 20 is located by using the radio resource provided in the radio area WA. The mobile station 20 may also be described as a radio terminal, radio equipment, a radio device, a mobile terminal, a terminal device, or a user terminal (user equipment: UE). For example, the mobile station 20 is a cellular phone, a smartphone, a sensor, or a meter (gauge). The mobile station 20 may be carried by a user or mounted in or fixed to a mobile object such as a vehicle.

In the present example, the radio area WA covering the mobile station 20 will also be described as a serving cell. In an example in which the radio area WA covers the mobile station 20, the mobile station 20 is connected to the base station 10 forming the radio area WA to be to be able to transmit and receive data to and from the base station 10 by using the radio resource provided in the radio area WA. Further, in the present example, a radio area WA different from the radio area WA covering the mobile station 20 will also be described as an interference cell.

In the present example, the radio signal transmitted by the base station 10 in the serving cell is a desired signal to the mobile station 20 covered by the serving cell. The desired signal is an example of a first signal. Further, in the present example, the radio signal transmitted by the base station 10 in the interference cell is an undesired signal to the mobile station 20 covered by the serving cell. The undesired signal may also be described as interference waves.

Configuration: Base Station

Figure 4:
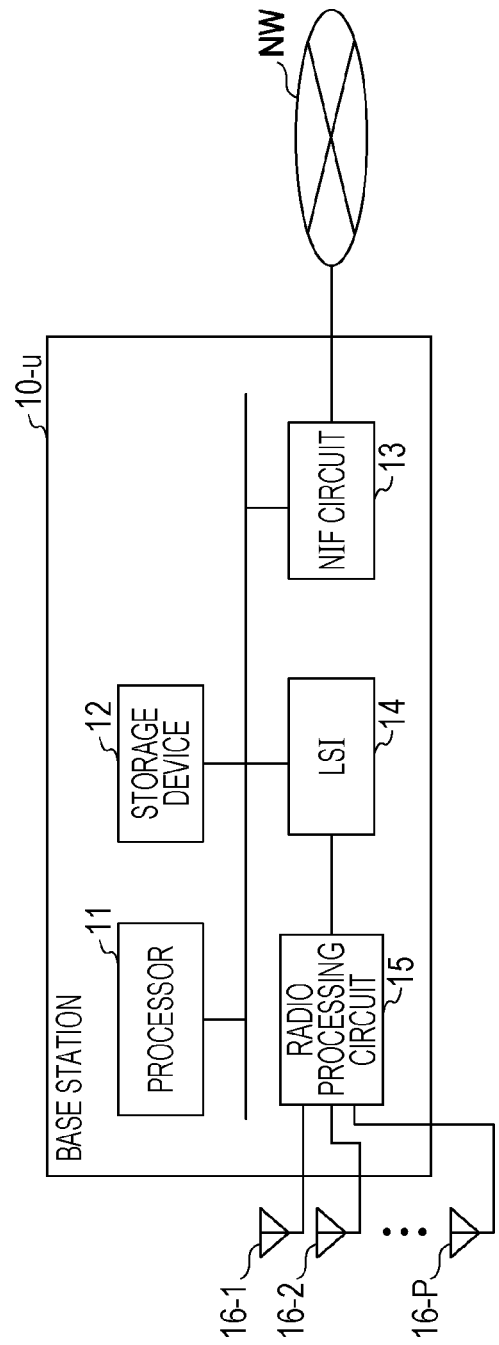
FIG. 4 is a block diagram illustrating a configuration example of a base station in FIG. 3.

As illustrated in FIG. 4, the base station 10-*u* illustratively includes a processor 11, a storage device 12, an NIF circuit 13, an LSI 14, a radio processing circuit 15, and the P number of antennas 16-1 to 16-P. In the present example, P represents an integer equal to or greater than 2. Hereinafter, the antennas 16-1 to 16-P will also be described as antennas 16 where distinction is unnecessary. NIF is an abbreviation for network interface. LSI is an abbreviation for large scale integration.

The processor 11 controls the operation of the base station 10-*u* by executing a program stored in the storage device 12. The NIF circuit 13 receives data to be transmitted to the mobile station 20 from the communication network NW. The NIF circuit 13 further transmits data received from the mobile station 20 to the communication network NW. In addition, the NIF circuit 13 transmits and receives control information to and from the communication network NW. The control information may include, for example, information for identifying another base station 10 forming a radio area WA different from the radio area WA formed by the base station 10-*u*.

The LSI 14 processes a digital signal to perform radio communication. The LSI 14 may be a programmable logic circuit device (a PLD or an FPGA, for example). PLD is an abbreviation for programmable logic device. FPGA is an abbreviation for field-programmable gate array. The radio processing circuit 15 performs radio communication via the antennas 16-1 to 16-P. Functions of the LSI 14 and the radio processing circuit 15 will be described in detail later.

Configuration: Mobile Station

Figure 5:
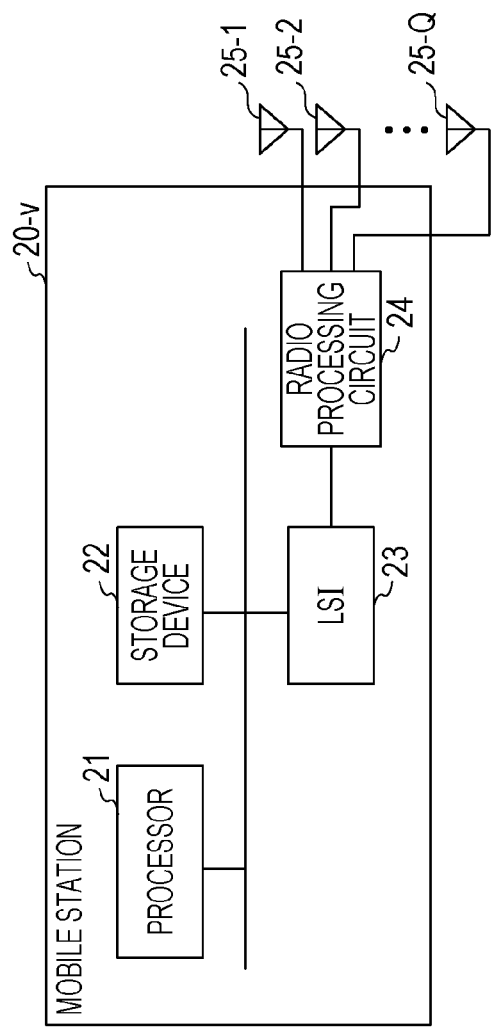
FIG. 5 is a block diagram illustrating a configuration example of a mobile station in FIG. 3.

As illustrated in FIG. 5, the mobile station 20-*v* illustratively includes a processor 21, a storage device 22, an LSI 23, a radio processing circuit 24, and the Q number of antennas 25-1 to 25-Q. In the present example, Q represents an integer equal to or greater than 2. Hereinafter, the antennas 25-1 to 25-Q will also be described as antennas 25 where distinction is unnecessary.

The processor 21 controls the operation of the mobile station 20-*v* by executing a program stored in the storage device 22. The LSI 23 processes a digital signal to perform radio communication. The LSI 23 may be a programmable logic circuit device (a PLD or an FPGA, for example). The radio processing circuit 24 performs radio communication via the antennas 25-1 to 25-Q. Functions of the LSI 23 and the radio processing circuit 24 will be described in detail later.

Functions: Base Station

Figure 6:
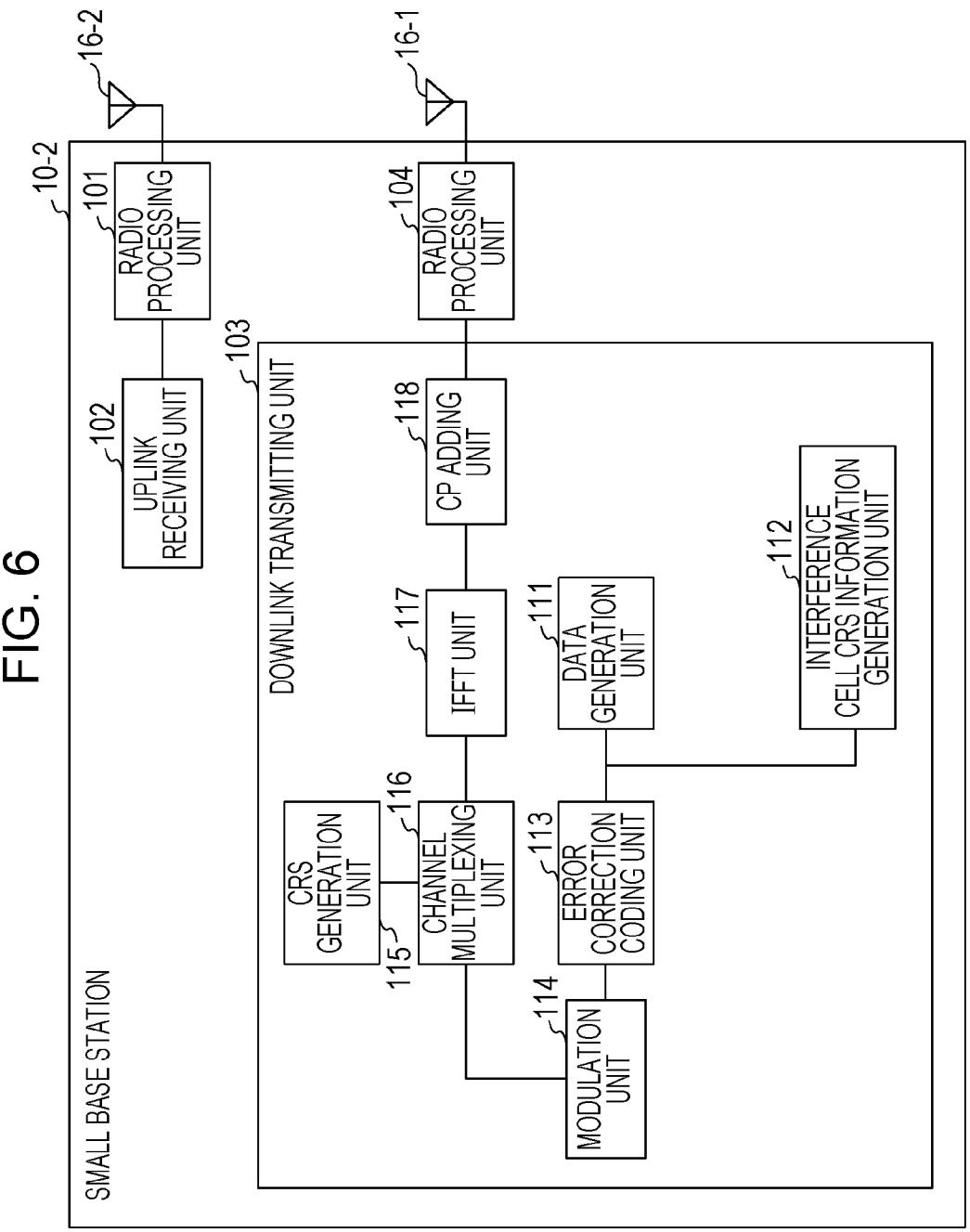
FIG. 6 is a block diagram illustrating an example of functions of a small base station in FIG. 3.

As illustrated in FIG. 6, the functions of the LSI 14 and the radio processing circuit 15 in the small base station 10-2 illustratively include a radio processing unit 101, an uplink receiving unit 102, a downlink transmitting unit 103, and a radio processing unit 104. The radio processing unit 104 is an example of a transmitting unit.

In the present example, the radio processing unit 101 receives a radio signal via a single antenna 16-2. The radio processing unit 101 may receive a radio signal via multiple antennas 16-2 to 16-P. The radio processing unit 101 performs frequency conversion (down conversion in this case) on the radio signal received via the antenna 16-2 to convert the signal from the radio frequency band into the baseband. The radio processing unit 101 performs A/D conversion on the signal subjected to the frequency conversion. A/D is an abbreviation for analog to digital.

The uplink receiving unit 102 processes the signal output by the radio processing unit 101. This process includes demodulation and error correction decoding, for example. The radio processing unit 101 and the uplink receiving unit 102 thus receive the uplink signal transmitted by the mobile station 20.

The downlink transmitting unit 103 illustratively includes a data generation unit 111, an interference cell CRS information generation unit 112, an error correction coding unit 113, a modulation unit 114, a CRS generation unit 115, a channel multiplexing unit 116, an IFFT unit 117, and a CP adding unit 118. IFFT is an abbreviation for inverse fast Fourier transform. CP is an abbreviation for cyclic prefix.

The data generation unit 111 generates data to be transmitted to the mobile station 20. The interference cell CRS information generation unit 112 generates interference cell CRS information. In the present example, the interference cell CRS information includes a cell identifier (ID) for identifying the interference cell, the number of transmitting antennas used in the interference cell, and MBSFN subframe allocation information. MBSFN is an abbreviation for Multicast-Broadcast Single-Frequency Network.

In the present example, the MBSFN subframe allocation information includes information for identifying the subframe allocated to the MBSFN. In the subframe allocated to the MBSFN in the present example, the CRS is allocated to the initial symbol time but not to the symbol times subsequent to the initial symbol time.

The small base station 10-2 may previously hold the interference cell CRS information. Further, the small base station 10-2 may receive the interference cell CRS information from a control station connected to the communication network NW or from another base station 10, for example. The interference cell CRS information may be transmitted to the mobile station 20 as RRC information, for example. RRC is an abbreviation for radio resource control.

The error correction coding unit 113 performs error correction coding on the data generated by the data generation unit 111 and the interference cell CRS information generated by the interference cell CRS information generation unit 112. An error correction code is a turbo code, for example. The error correction code may also be a Reed-Solomon code or a convolutional code, for example.

The modulation unit 114 modulates the data coded by the error correction coding unit 113. For example, the modulation may conform to a modulation scheme including a multi-level modulation scheme, such as QPSK, 16 QAM, or 64 QAM. QPSK is an abbreviation for quadriphase phase-shift keying. QAM is an abbreviation for quadrature amplitude modulation. In the present example, the modulation unit 114 outputs a modulation symbol as modulated data.

The CRS generation unit 115 generates a reference signal (CRS) allowing identification of a cell. In the present example, the reference signal is previously known to both the base station 10 and the mobile station 20. For example, each of the base station 10 and the mobile station 20 may previously hold the reference signal, or may be capable of generating the reference signal.

The channel multiplexing unit 116 multiplexes the data to be transmitted to the mobile station 20 and the reference signal. In the present example, the channel multiplexing unit 116 multiplexes the data modulated by the modulation unit 114 and the CRS generated by the CRS generation unit 115.

Figure 7:
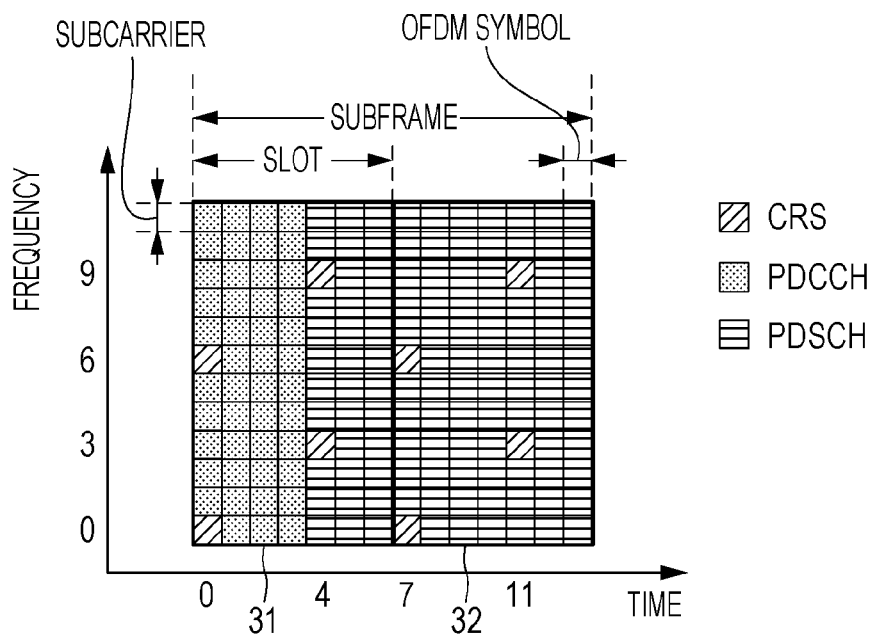
FIG. 7 is an explanatory diagram illustrating an example of allocation of a radio resource in a subframe in downlink according to an LTE system.

FIG. 7 illustrates an example of allocation of the radio resource in the subframe in downlink according to the LTE system. It is assumed in FIG. 7 that a normal CP is used, and that the number of transmitting antennas is 1. The allocation of the radio resource may be different from that in FIG. 7.

In the present example, the radio resource is identified by time and frequency. The radio resource corresponding to the time of one OFDM symbol in one subcarrier in OFDM will be described as a resource element (RE). That is, the radio resource includes multiple REs different from one another in the combination of time and frequency. In the present example, a period corresponding to 7 successive REs along the time axis will be described as a slot. Further, 2 successive slots along the time axis form one subframe.

In the present example, REs corresponding to 12 successive subcarriers along the frequency axis in the REs included in one slot along the time axis will be described as a resource block (RB). In the present example, therefore, one RB is formed of 84 (=12×7) REs.

As illustrated in FIG. 7, in the REs in the zeroth and sixth subcarriers, the REs in the zeroth and seventh symbol times are allocated to the CRS. The first symbol time is a time corresponding to the first OFDM symbol along the time axis. Further, in the REs in the third and ninth subcarriers, the REs in the fourth and eleventh symbol times are allocated to the CRS.

Further, in the REs in the zeroth to third symbol times at the head of the subframe, the REs different from the REs allocated to the CRS are allocated to a PDCCH. PDCCH is an abbreviation for physical downlink control channel. The PDCCH is an example of a control channel. The control channel is a channel for transmitting the control information.

In the REs included in two RBs 31 and 32 illustrated in FIG. 7, the REs different from the REs allocated to the PDCCH and the CRS are allocated to a PDSCH. PDSCH is an abbreviation for physical downlink shared channel. The PDSCH is an example of a data channel. The data channel is a channel for transmitting the data to be transmitted to the mobile station 20.

The IFFT unit 117 in FIG. 6 performs inverse fast Fourier transform (IFFT) on the signal multiplexed by the channel multiplexing unit 116. The CP adding unit 118 adds the CP to the signal subjected to the IFFT by the IFFT unit 117, to thereby generate an OFDM symbol.

The radio processing unit 104 performs D/A conversion on the signal output by the downlink transmitting unit 103. D/A is an abbreviation for digital to analog. The radio processing unit 104 performs frequency conversion (up conversion in this case) on the signal subjected to the D/A conversion to convert the signal from the baseband into the radio frequency band. The radio processing unit 104 transmits the signal subjected to the frequency conversion via the antenna 16-1.

The radio processing unit 104 may transmit the radio signal via the multiple antennas 16-1 to 16-P in FIG. 4. Further, the radio processing units 101 and 104 may share at least one of the multiple antennas 16-1 to 16-P.

In the present example, the macro base station 10-1 has functions similar to those of the small base station 10-2. The macro base station 10-1 does not have to use the interference cell CRS information generation unit 112.

Figure 8:
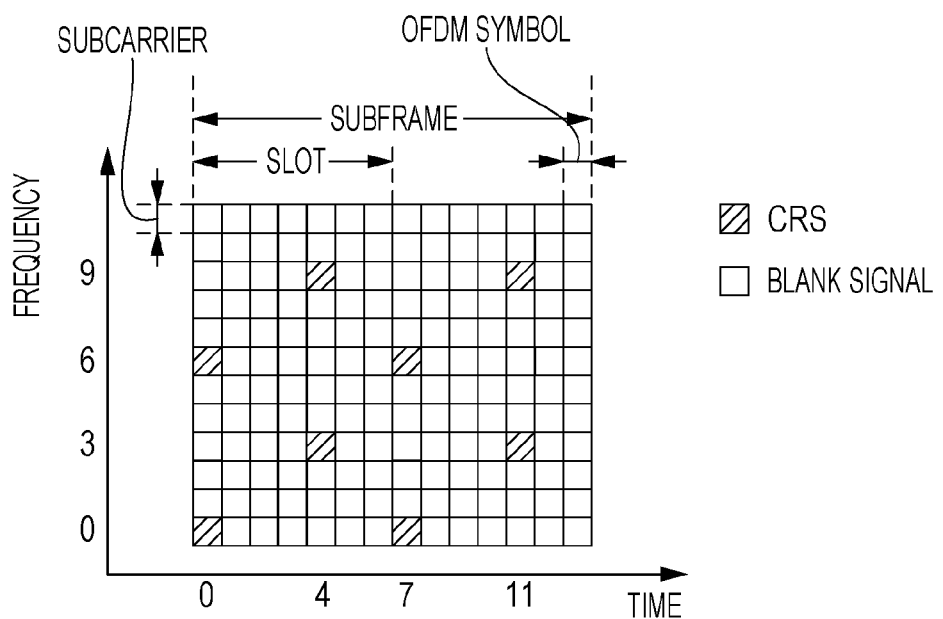
FIG. 8 is an explanatory diagram illustrating an example of allocation of a radio resource in an ABS in downlink according to the LTE system.

Further, the macro base station 10-1 may transmit the ABS. FIG. 8 illustrates an example of allocation of the radio resource in the ABS in downlink according to the LTE system. Similarly to the case in FIG. 7, it is assumed in FIG. 8 that the normal CP is used, and that the number of transmitting antennas is 1. The allocation of the radio resource may be different from that in FIG. 8.

As illustrated in FIG. 8, in the ABS, REs are allocated to the CRS similarly to the case in FIG. 7. In the REs included in the ABS, the REs different from the REs allocated to the CRS are allocated to a blank signal, unlike the case in FIG. 7. In the present example, transmission of the blank signal indicates transmission of carrier waves without being modulated or transmission of a predetermined dummy signal. In the ABS, REs may be allocated to the synchronization signal and the broadcast signal. In the present example, the reference signal and the synchronization signal are examples of a known signal previously known to both the base station 10 and the mobile station 20.

Functions: Mobile Station

Figure 9:
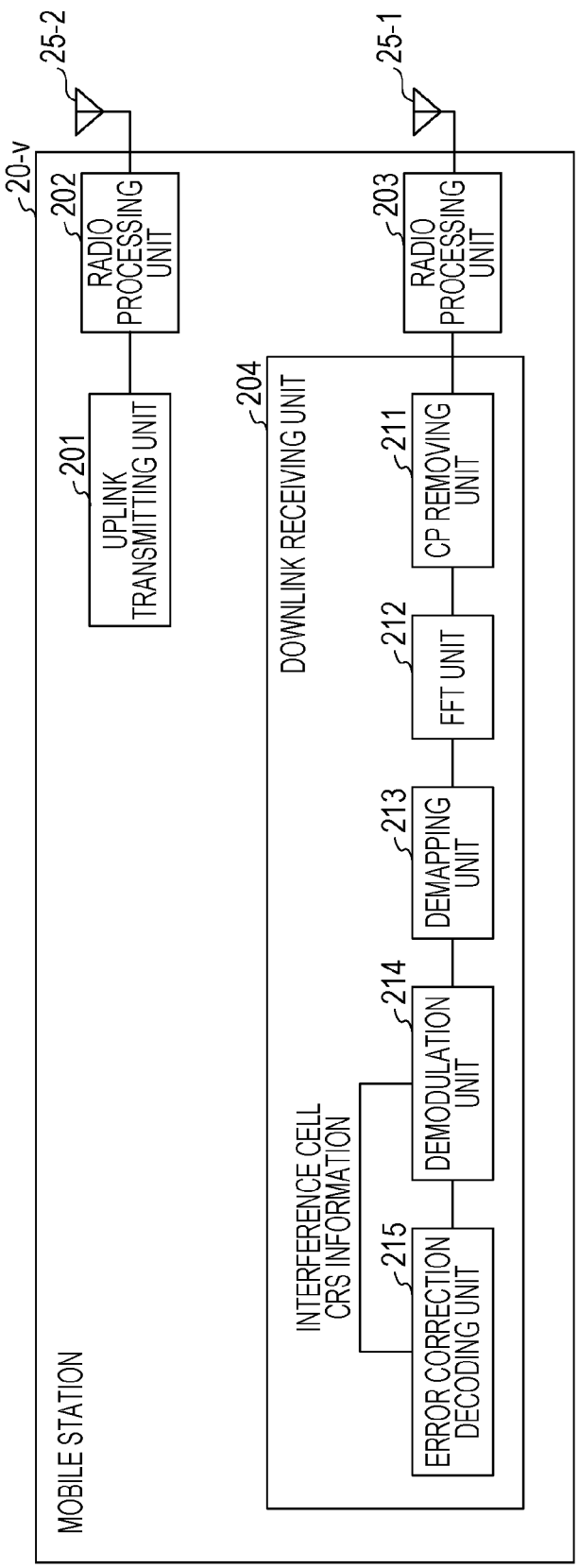
FIG. 9 is a block diagram illustrating an example of functions of the mobile station in FIG. 3.

As illustrated in FIG. 9, the functions of the LSI 23 and the radio processing circuit 24 in the mobile station 20-V in FIG. 5 illustratively include an uplink transmitting unit 201, a radio processing unit 202, a radio processing unit 203, and a downlink receiving unit 204. The radio processing unit 203 is an example of a receiving unit.

The uplink transmitting unit 201 generates data to be transmitted to the base station 10, performs error correction coding on the generated data, and modulates the coded data.

The radio processing unit 202 performs D/A conversion on the signal modulated by the uplink transmitting unit 201. The radio processing unit 202 performs frequency conversion (up conversion in this case) on the signal subjected to the D/A conversion to convert the signal from the baseband into the radio frequency band. The radio processing unit 202 transmits the signal subjected to the frequency conversion via an antenna 25-2. The radio processing unit 202 may transmit the radio signal via multiple antennas 25-2 to 25-Q in FIG. 5. The uplink transmitting unit 201 and the radio processing unit 202 thus transmit the uplink signal to the base station 10.

In the present example, the radio processing unit 203 receives a radio signal via the single antenna 25-1. The radio processing unit 203 may receive a radio signal via the multiple antennas 25-1 to 25-Q. Further, the radio processing units 202 and 203 may share at least one of the multiple antennas 25-1 to 25-Q.

The radio processing unit 203 performs frequency conversion (down conversion in this case) on the radio signal received via the antenna 25-1 to convert the signal from the radio frequency band into the baseband. The radio processing unit 203 performs A/D conversion on the signal subjected to the frequency conversion.

The downlink receiving unit 204 processes the signal output by the radio processing unit 203. This process includes demodulation and error correction decoding, for example. The downlink receiving unit 204 illustratively includes a CP removing unit 211, an FFT unit 212, a demapping unit 213, a demodulation unit 214, and an error correction decoding unit 215. FFT is an abbreviation for fast Fourier transform.

The CP removing unit 211 removes the CP from the signal output by the radio processing unit 203. The FFT unit 212 performs fast Fourier transform (FFT) on the signal subjected to the CP removal. The demapping unit 213 performs demapping on the signal subjected to the FFT by the FFT unit 212. For example, the demapping may include a process of extracting components for respective channels or REs included in the signal subjected to the FFT.

The demodulation unit 214 demodulates the signal subjected to the demapping by the demapping unit 213. The signal input to the demodulation unit 214 is an example of a received signal. Details of the demodulation unit 214 will be described later. The error correction decoding unit 215 performs error correction decoding on the signal demodulated by the demodulation unit 214. The demodulation by the demodulation unit 214 and the error correction decoding by the error correction decoding unit 215 are an example of a second demodulation process on the desired signal.

With the above-described configuration, the downlink receiving unit 204 reproduces the information or data transmitted by the base station 10. The reproduction of the information or data may also be described as recovery of the information or data. In the present example, the error correction decoding unit 215 informs the demodulation unit 214 of the interference cell CRS information in the information or data subjected to the error correction decoding.

Figure 10:
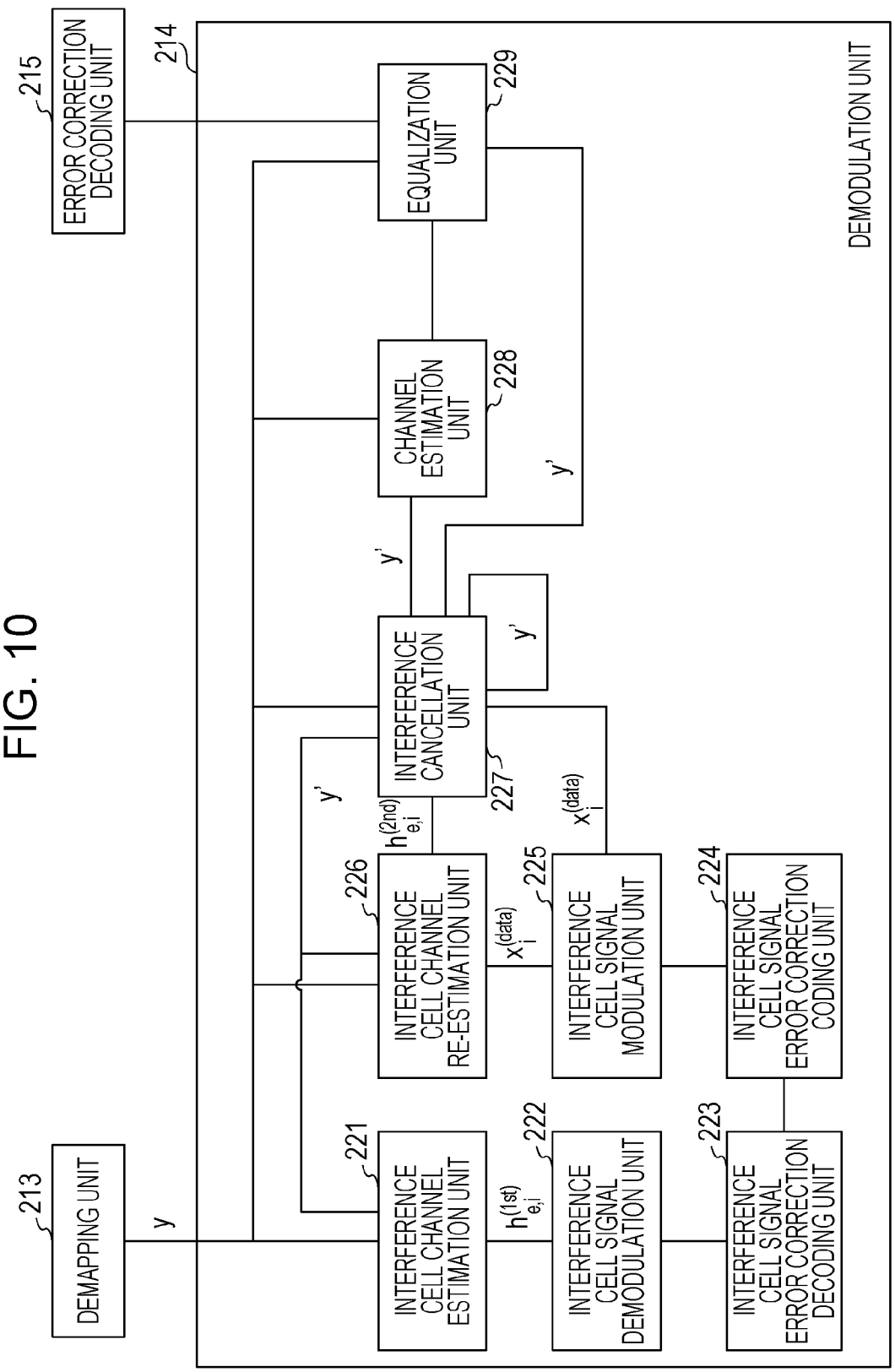
FIG. 10 is a block diagram illustrating an example of functions of a demodulation unit in FIG. 9.

Herein, details of the demodulation unit 214 will be described. As illustrated in FIG. 10, the demodulation unit 214 illustratively includes an interference cell channel estimation unit 221, an interference cell signal demodulation unit 222, an interference cell signal error correction decoding unit 223, an interference cell signal error correction coding unit 224, and an interference cell signal modulation unit 225. The demodulation unit 214 further illustratively includes an interference cell channel re-estimation unit 226, an interference cancellation unit 227, a channel estimation unit 228, and an equalization unit 229.

In the present example, the demodulation unit 214 selects an interference cell to be subjected to the cancellation process from multiple interference cells. When there is only one interference cell, the demodulation unit 214 may select the one interference cell as the interference cell to be subjected to the cancellation process. The cancellation process is a process of cancelling a component of an input value of the received signal attributed to the interference signal transmitted in the interference cell to be subjected to the process. The interference signal is an example of a second signal. The interference signal may also be described as a target signal.

In the present example, the interference signal is a signal different from the known signal. The signal different from the known signal may also be described as an unknown signal. In the present example, the interference signal is a signal unknown to the mobile station 20 before the transmission of the signal to the mobile station 20 from the base station 10. For example, the interference signal is a signal representing at least one of broadcast information, the control information, and the data to be transmitted to the mobile station 20. The interference signal may be a part of a signal representing the broadcast information, the control information, or the data to be transmitted to the mobile station 20.

For example, the demodulation unit 214 may select from the interference cells an interference cell having a reception strength higher than a predetermined threshold strength as the interference cell to be subjected to the cancellation process. Further, the demodulation unit 214 may select from the interference cells a predetermined number of interference cells of the highest reception strength as the interference cells to be subjected to the cancellation process. The demodulation unit 214 may execute the cancellation process on all of the interference cells without selecting a particular interference cell to be subjected to the cancellation process.

In the present example, $N_{cancel}$ represents the number of selected interference cells. $N_{cancel}$ representing the number of selected interference cells is equal to or less than $N_{cell}$ representing the total number of interference cells.

In the present example, the demodulation unit 214 sequentially executes the cancellation process on the selected interference cells. For example, the demodulation unit 214 uses a provisional value of the received signal corresponding to the result of the cancellation process on a given interference cell as the input value of the received signal in the cancellation process on another interference cell. In the present example, the demodulation unit 214 uses the provisional value of the received signal corresponding to the result of the cancellation process on the i-th interference cell in the selected interference cells as the input value of the received signal in the cancellation process on the (i+1)-th interference cell in the selected interference cells. Herein, i represents an integer ranging from 1 to $N_{cancel}-1$.

In the present example, the demodulation unit 214 uses the received signal y output by the demapping unit 213 as the input value of the received signal in the cancellation process on the first interference cell in the selected interference cells.

A description will be given below of the cancellation process on the i-th interference cell in the selected interference cells.

The cancellation process includes respective processes on the $N_{data}$ number of cancellation target REs. The cancellation target REs are REs to be subjected to the cancellation process. In the present example, the cancellation target REs are REs allocated to the interference signal. In the present example, the demodulation unit 214 identifies the cancellation target REs in the i-th interference cell based on the interference cell CRS information. $N_{data}$ represents an integer equal to or greater than 1. $N_{data}$ representing the number of cancellation target REs may be different or the same between the interference cells.

The interference cell channel estimation unit 221 estimates the channel between the base station 10 and the mobile station 20 in the i-th interference cell. In the present example, the interference cell channel estimation unit 221 estimates the channel for each of the $N_{est}$ number of estimation target REs by using the input value of the received signal for the $N_{RS}$ number of CRS-allocated REs in the i-th interference cell.

The CRS-allocated REs are REs allocated to the CRS. In the present example, the CRS-allocated REs may be identified based on the interference cell CRS information. The estimation target REs are REs to be subjected to the estimation of the channel. In the present example, the estimation target REs are at least parts of the REs allocated to the interference signal (that is, the cancellation target REs).

$N_{est}$ and $N_{RS}$ each represent an integer equal to or greater than 1. In the present example, $N_{est}$ is equal to or less than $N_{data}$. In the present example, the estimation of the channel uses the received signal for the $N_{RS}$ number of CRS-allocated REs closest to the estimation target REs in frequency and time.

As for REs in which a received signal y' subjected to the cancellation by the later-described interference cancellation unit 227 is output, the received signal used to estimate the channel for the i-th interference cell is the received signal y' subjected to the cancellation. As for REs different from the REs in which the received signal y' subjected to the cancellation by the later-described interference cancellation unit 227 is output, the received signal used to estimate the channel for the i-th interference cell is the received signal y input to the demodulation unit 214.

In the present example, the interference cell channel estimation unit 221 estimates a channel $h_{e,i}^{(1st)}$ for the $N_{est}$ number of estimation target REs in the i-th interference cell based on mathematical formula 6.

$$h_{e,i}^{(1st)} = W^{(1st)}(X_i^{(CRS)})^H y^{(CRS)} \qquad (6)$$

Herein, $A^H$ represents an Hermitian conjugate (that is, complex transpose conjugate) of matrix A. Further, $h_{e,i}^{(1st)}$ is expressed by mathematical formula 7. The element in the p-th row of $h_{e,i}^{(1st)}$ represents the channel for the p-th estimation target RE in the $N_{est}$ number of estimation target REs. Herein, p represents an integer ranging from 1 to $N_{est}$.

$$h_{e,j}^{(1st)} = \begin{bmatrix} h_{e,i}^{(1st)}(1) \\ h_{e,i}^{(1st)}(2) \\ \vdots \\ h_{e,i}^{(1st)}(N_{est}) \end{bmatrix} \qquad (7)$$

Further, $y^{(CRS)}$ is expressed by mathematical formula 8. The element in the q-th row of $y^{(CRS)}$ represents the received signal for the q-th CRS-allocated RE in the $N_{RS}$ number of CRS-allocated REs. Herein, q represents an integer ranging from 1 to $N_{RS}$.

$$y^{(CRS)} = \begin{bmatrix} y^{(CRS)}(1) \\ y^{(CRS)}(2) \\ \vdots \\ y^{(CRS)}(N_{RS}) \end{bmatrix} \qquad (8)$$

Further, $X_i^{(CRS)}$ is an $N_{RS}$-row, $N_{RS}$-column diagonal matrix expressed by mathematical formula 9. Herein, $x_i^{(CRS)}(q)$ represents the CRS allocated to the q-th CRS-allocated RE in the $N_{RS}$ number of CRS-allocated REs used to estimate the channel. Further, an equation is expressed as $E\{|x_i^{(CRS)}(1)|^2\} = E\{|x_i^{(CRS)}(2)|^2\} = \ldots = E\{|x_i^{(CRS)}(N_{RS})|^2\} = E\{|x_i^{(CRS)}|^2\}$. Herein, $E\{A\}$ represents the mean of A.

$$X_i^{(CRS)} = \begin{bmatrix} x_i^{(CRS)}(1) & & & 0 \\ & x_i^{(CRS)}(2) & & \\ & & \ddots & \\ 0 & & & x_i^{(CRS)}(N_{RS}) \end{bmatrix} \qquad (9)$$

Further, $W^{(1st)}$ represents an $N_{est}$-row, $N_{RS}$-column channel estimation weight matrix. The row vector of the p-th row of the channel estimation weight matrix $W^{(1st)}$ represents the weight vector for the p-th estimation target RE in the $N_{est}$ number of estimation target REs. The element in the q-th column of the weight vector represents the weight coefficient for the q-th CRS-allocated RE in the $N_{RS}$ number of CRS-allocated REs used to estimate the channel. The weight coefficient may be previously determined in accordance with the system for estimating the channel. The weight coefficient is also referred to as the tap coefficient.

The estimation of the channel between the base station 10 and the mobile station 20 in the interference cell by the interference cell channel estimation unit 221 is an example of a second estimation process. The interference cell channel estimation unit 221 is an example of a second estimation unit that executes the second estimation process.

The interference cell signal demodulation unit 222 demodulates the received signal for the $N_{data}$ number of cancellation target REs in the i-th interference cell based on the estimated value $h_{e,i}^{(1st)}$ of the channel estimated by the interference cell channel estimation unit 221.

The interference cell signal error correction decoding unit 223 performs error correction decoding on the signal demodulated by the interference cell signal demodulation unit 222. Thereby, the interference cell signal error correction decoding unit 223 reproduces the information or data represented by the interference signal transmitted by the base station 10 in the i-th interference cell.

The demodulation by the interference cell signal demodulation unit 222 and the error correction decoding by the interference cell signal error correction decoding unit 223 are an example of a first demodulation process on the interference signal. The information or data reproduced by the interference cell signal error correction decoding unit 223 is an example of the execution result of the first demodulation process. The interference cell signal demodulation unit 222 and the interference cell signal error correction decoding unit 223 are an example of a first processing unit that executes the first demodulation process.

When the base station 10 transmits the interference signal without executing the error correction coding, the first demodulation process may not include the error correction decoding. In this case, the demodulation unit 214 does not have to use the interference cell signal error correction decoding unit 223.

The interference cell signal error correction coding unit 224 performs error correction coding on the information or data reproduced by the interference cell signal error correction decoding unit 223. When the base station 10 transmits the interference signal without executing the error correction coding, the demodulation unit 214 does not have to use the interference cell signal error correction coding unit 224.

The interference cell signal modulation unit 225 modulates the information or data coded by the interference cell signal error correction coding unit 224. Thereby, the interference cell signal modulation unit 225 generates the interference signal transmitted by the base station 10. The interference signal generated by the interference cell signal modulation unit 225 may also be described as a training signal.

The interference cell channel re-estimation unit 226 re-estimates the channel between the base station 10 and the mobile station 20 in the i-th interference cell. In the present example, the interference cell channel re-estimation unit 226 re-estimates the channel for each of the $N_{est}$ number of estimation target REs by using the generated interference signal and the input value of the received signal for the $N_{data}$ number of cancellation target REs in the i-th interference cell.

As for the REs in which the received signal y' subjected to the cancellation by the later-described interference cancellation unit 227 is output, the received signal used to re-estimate the channel for the i-th interference cell is the received signal y' subjected to the cancellation. As for the REs different from the REs in which the received signal y' subjected to the cancellation by the later-described interference cancellation unit 227 is output, the received signal used to re-estimate the channel for the i-th interference cell is the received signal y input to the demodulation unit 214.

In the present example, the interference cell channel re-estimation unit 226 estimates a channel $h_{e,1}^{(2nd)}$ for the $N_{est}$ number of estimation target REs in the i-th interference cell based on mathematical formula 10.

$$h_{e,i}^{(2nd)} = W_i^{(2nd)}(X_i^{(data)})^H y^{(data)} \tag{10}$$

Herein, $h_{e,i}^{(2nd)}$ is expressed by mathematical formula 11. The element in the p-th row of $h_{e,i}^{(2nd)}$ represents the channel for the p-th estimation target RE in the $N_{est}$ number of estimation target REs.

$$h_{e,i}^{(2nd)} = \begin{bmatrix} h_{e,i}^{(2nd)}(1) \\ h_{e,i}^{(2nd)}(2) \\ \vdots \\ h_{e,i}^{(2nd)}(N_{est}) \end{bmatrix} \tag{11}$$

Further, $y^{(data)}$ is expressed by mathematical formula 12. The element in the w-th row of $y^{(data)}$ represents the received signal for the w-th cancellation target RE in the $N_{data}$ number of cancellation target REs. Herein, w represents an integer ranging from 1 to $N_{data}$.

$$y^{(data)} = \begin{bmatrix} y^{(data)}(1) \\ y^{(data)}(2) \\ \vdots \\ y^{(data)}(N_{data}) \end{bmatrix} \tag{12}$$

Further, $X_i^{(data)}$ is an $N_{data}$-row, $N_{data}$-column diagonal matrix expressed by mathematical formula 13. Herein, $x_i^{(data)}(w)$ represents the interference signal allocated to the w-th cancellation target RE in the $N_{data}$ number of cancellation target REs used to estimate the channel and generated by the interference cell signal modulation unit 225. Further, an equation is expressed as $E\{|x_i^{(data)}(1)|^2\} = E\{|x_i^{(data)}(2)|^2\} = \ldots = E\{|x_i^{(data)}(N_{data})|^2\} = E\{|x_i^{(data)}|^2\}$.

$$X_i^{(data)} = \begin{bmatrix} x_i^{(data)}(1) & & & 0 \\ & x_i^{(data)}(2) & & \\ & & \ddots & \\ 0 & & & x_i^{(data)}(N_{data}) \end{bmatrix} \tag{13}$$

Further, $W_i^{(2nd)}$ represents an $N_{est}$-row, $N_{data}$-column channel estimation weight matrix for the i-th interference cell. The row vector of the p-th row of the channel estimation weight matrix $W_i^{(2nd)}$ represents the weight vector for the p-th estimation target RE in the $N_{est}$ number of estimation target REs. The element in the w-th column of the weight vector represents the weight coefficient for the w-th cancellation target RE in the $N_{data}$ number of cancellation target REs used to estimate the channel.

In the present example, $N_{data}$ is greater than $N_{RS}$. The accuracy of channel estimation by the interference cell channel re-estimation unit 226 is therefore higher than the accuracy of channel estimation by the interference cell channel estimation unit 221. Further, in the present example, the frequency and time of the REs used for channel estimation by the interference cell channel re-estimation unit 226 are closer to the frequency and time of the estimation target REs than the frequency and time of the REs used for channel estimation by the interference cell channel estimation unit 221. The accuracy of channel estimation by the interference cell channel re-estimation unit 226 is therefore higher than the accuracy of channel estimation by the interference cell channel estimation unit 221.

The estimation of the channel between the base station 10 and the mobile station 20 in the interference cell by the interference cell channel re-estimation unit 226 is an example of a first estimation process. The interference cell channel re-estimation unit 226 is an example of a first estimation unit that executes the first estimation process.

The interference cancellation unit 227 calculates the provisional value y' of the received signal based on the input value y of the received signal, the channel $h_{e,i}^{(2nd)}$ estimated by the interference cell channel re-estimation unit 226, the interference signal $x_i^{(data)}$ generated by the interference cell signal modulation unit 225, and mathematical formula 14.

$$y'(k,l) = y(k,l) - h_{e,i}^{(2nd)}(R_i^{(est)}(k,l)) x_i^{(data)}(R_i^{(data)}(k,l)) \tag{14}$$

Herein, k and l represent the subcarrier number and the symbol time number of the RE, respectively. In the present example, the provisional value y' of the received signal is calculated for each of the cancellation target REs in the i-th interference cell. In mathematical formula 14, therefore, the $N_{data}$ number of cancellation target REs in the i-th interference cell are identified by the $N_{data}$ number of combinations of k and l.

$R_i^{(data)}(k, l)$ represents the number of the RE identified by the subcarrier number k and the symbol time number l in the $N_{data}$ number of cancellation target REs in the i-th interference cell. $R_i^{(est)}(k,l)$ represents the number of the RE closest in frequency and time to the RE identified by the subcarrier number k and the symbol time number l in the $N_{est}$ number of estimation target REs in the i-th interference cell.

Herein, y(k, l) represents the input value of the received signal for the RE identified by the subcarrier number k and the symbol time number l. Further, y'(k, l) represents the provisional value of the received signal for the RE identified by the subcarrier number k and the symbol time number l.

As indicated in mathematical formula 14, the interference cancellation unit 227 subtracts the replica signal of the interference signal in the i-th interference cell from the received signal y. Thereby, the interference cancellation unit 227 cancels from the received signal the component attributed to the interference signal transmitted in the i-th interference cell. In the present example, the replica signal of the interference signal is a signal obtained by multiplying the interference signal $x_i^{(data)}$ transmitted in the i-th interference cell by the estimated value $h_{e,i}^{(2nd)}$ of the channel between the base station 10 and the mobile station 20 in the i-th interference cell.

The interference cancellation unit 227 outputs the provisional value y' of the received signal calculated in the cancellation process on the $N_{cancel}$-th interference cell as the received signal y' subjected to the cancellation. The interference cancellation unit 227 may perform a cancellation process on the CRS in addition to the cancellation process on the interference signal. Further, the interference cancellation unit 227 may perform a cancellation process on the synchronization signal in addition to the cancellation process on the interference signal. The interference cancellation unit 227 is an example of a second processing unit that executes the cancellation process.

The channel estimation unit 228 in FIG. 10 estimates the channel between the base station 10 and the mobile station 20 in the serving cell. In the present example, the channel estimation unit 228 estimates the channel by using the received signal for the CRS-allocated REs in the serving cell. For example, the channel estimation unit 228 may estimate the channel for the CRS-allocated REs in the serving cell.

As for the REs in which the received signal y' subjected to the cancellation by the interference cancellation unit 227 is output, the received signal used to estimate the channel for the serving cell is the received signal y' subjected to the cancellation. As for the REs different from the REs in which the received signal y' subjected to the cancellation by the interference cancellation unit 227 is output, the received signal used to estimate the channel for the serving cell is the received signal y input to the demodulation unit 214.

The equalization unit 229 equalizes the received signal by using the received signal and the estimated value of the channel estimated by the channel estimation unit 228. As for the REs in which the received signal y' subjected to the cancellation by the interference cancellation unit 227 is output, the received signal to be subjected to the equalization is the received signal y' subjected to the cancellation. As for the REs different from the REs in which the received signal y' subjected to the cancellation by the interference cancellation unit 227 is output, the received signal to be subjected to the equalization is the received signal y input to the demodulation unit 214.

The equalization unit 229 calculates a log likelihood ratio (LLR) for soft decision decoding based on the equalized received signal. For example, the equalization unit 229 may calculate the LLR by using a method described in Japanese Patent No. 5326976.

Operation

An operation of the radio communication system 1 will now be described. Herein, a description will be given of a part of the operation of the radio communication system 1 related to the demodulation in the mobile station 20-1.

Figure 11:
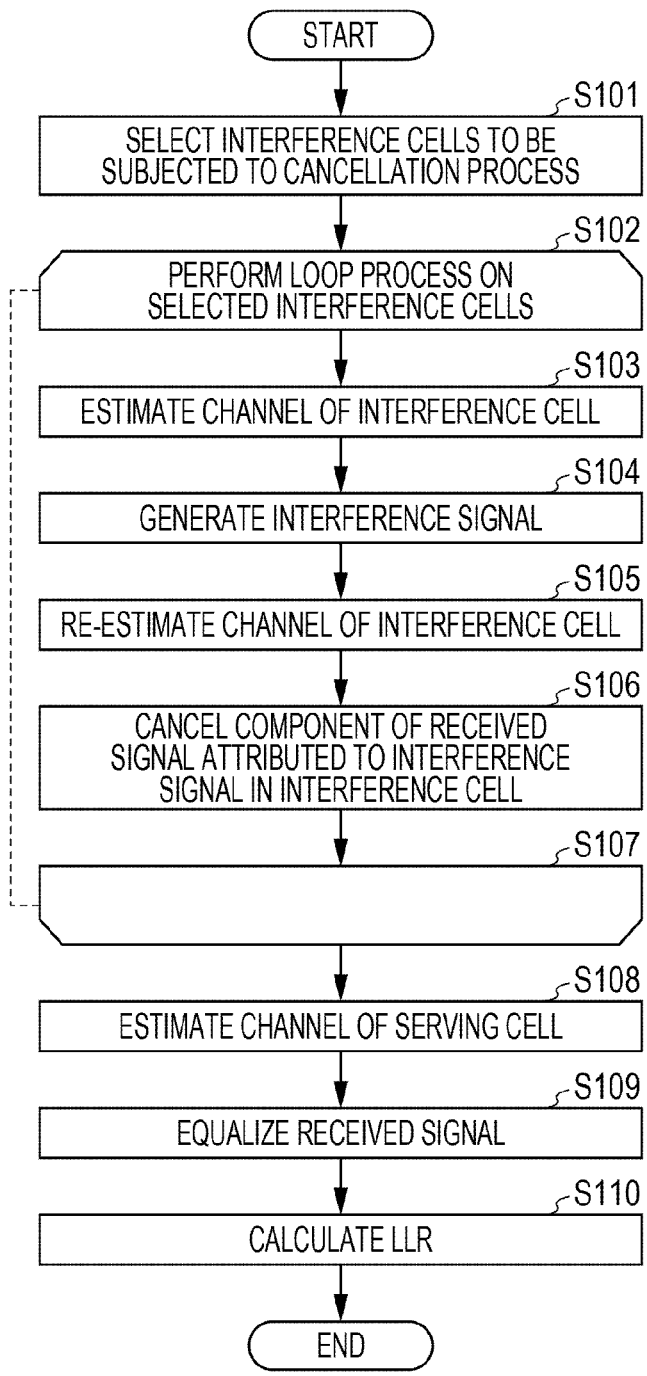
FIG. 11 is a flowchart illustrating an example of processing executed by the mobile station in FIG. 3.

The mobile station 20-1 executes the processing illustrated by the flowchart in FIG. 11. In the present example, the mobile station 20-1 selects interference cells to be subjected to the cancellation process from multiple interference cells (step S101 in FIG. 11).

The mobile station 20-1 then executes a loop process (steps S102 to S107 in FIG. 11) in which the respective selected interference cells are sequentially processed one by one.

In the loop process, the mobile station 20-1 first estimates the channel of an interference cell, which is the channel between the base station 10 and the mobile station 20-1 in the interference cell to be processed (step S103 in FIG. 11). In the present example, the mobile station 20-1 estimates the channel for the estimation target REs in the interference cell based on the CRS transmitted by the base station 10 in the interference cell to be processed.

The mobile station 20-1 demodulates the received signal for the cancellation target REs based on the estimated value of the channel of the interference cell. The mobile station 20-1 further performs error correction decoding on the demodulated signal. Thereby, the mobile station 20-1 reproduces the information or data represented by the interference signal transmitted by the base station 10 in the interference cell.

Further, the mobile station 20-1 performs error correction coding on the reproduced information or data. In addition, the mobile station 20-1 modulates the coded information or data. Thereby, the mobile station 20-1 generates the interference signal transmitted by the base station 10 (step S104 in FIG. 11).

The mobile station 20-1 further re-estimates the channel of the interference cell (step S105 in FIG. 11). In the present example, the mobile station 20-1 re-estimates the channel for the estimation target REs in the interference cell based on the generated interference signal.

The mobile station 20-1 updates the received signal by cancelling the component of the received signal attributed to the interference signal transmitted in the interference cell based on the re-estimated value of the channel of the interference cell, the generated interference signal, and the received signal (step S106 in FIG. 11).

The mobile station 20-1 then executes the above-described loop process on all of the remaining selected interference cells (steps S102 to S107 in FIG. 11), and thereafter proceeds to step S108.

The mobile station 20-1 estimates the channel of the serving cell, which is the channel between the base station 10-2 and the mobile station 20-1 in the serving cell (the radio area WA-2 in the present example) based on the received signal subjected to the cancellation (step S108 in FIG. 11). In the present example, the mobile station 20-1 estimates the channel for the REs allocated to the CRS in the serving cell based on the CRS transmitted by the base station 10-2 in the serving cell.

The mobile station 20-1 equalizes the received signal based on the estimated value of the channel of the serving cell and the received signal subjected to the cancellation (step S109 in FIG. 11). The mobile station 20-1 calculates the LLR for soft decision decoding based on the equalized received signal (step S110 in FIG. 11).

As described above, the mobile station 20-1 according to the first embodiment executes the first demodulation process on the interference signal transmitted in the radio area WA-1 different from the radio area WA-2 in which the desired signal is transmitted. The mobile station 20-1 further executes the first estimation process of estimating the channel for the radio area WA-2 based on the execution result of the first demodulation process. In addition, the mobile station 20-1 executes the cancellation process of cancelling the component of the received signal attributed to the interference signal transmitted in the radio area WA-1 based on the estimated channel. The mobile station 20-1 further executes the second demodulation process on the desired signal based on the execution result of the cancellation process.

According to this configuration, the component of the received signal attributed to the interference signal transmitted in the radio area WA-1 is cancelled with sufficiently high accuracy. Consequently, the reception quality of the desired signal transmitted in the radio area WA-2 is enhanced.

The mobile station 20-1 according to the first embodiment further executes the second estimation process of estimating the channel for the radio area WA-1 based on the CRS transmitted in the radio area WA-1. The first demodulation process is executed based on the channel estimated by the second estimation process.

According to this configuration, the mobile station 20-1 executes the first demodulation process on the interference signal based on the channel for the radio area WA-1 estimated based on the CRS. Thereby, the reception quality of the interference signal is enhanced. Consequently, the channel for the radio area WA-1 is estimated with high accuracy in the first estimation process.

Further, in the mobile station 20-1 according to the first embodiment, the cancellation process includes generating the replica signal of the interference signal based on the product of the channel estimated by the first estimation process and the execution result of the first demodulation process. The cancellation process further includes subtracting the generated replica signal from the received signal.

According to this configuration, the component of the received signal attributed to the interference signal transmitted in the radio area WA-1 is cancelled with sufficiently high accuracy. Consequently, the reception quality of the desired signal transmitted in the radio area WA-2 is enhanced.

As described above, the demodulation unit 214 according to the first embodiment sequentially executes the cancellation process on the interference cells. The demodulation unit 214 may, however, execute the cancellation process in parallel on the interference cells.

In this case, the demodulation unit 214 may estimate the channel for each of the selected interference cells based on the CRS, generate the interference signal based on the estimated channel, and re-estimate the channel for the interference cell based on the generated interference signal. The demodulation unit 214 may further cancel the component of the received signal attributed to the interference signal transmitted in each of the interference cells based on the re-estimated value $h_{e,i}^{(2nd)}$ of the channel of the interference cell, the generated interference signal $x_i^{(data)}$, and mathematical formula 15. According to this configuration, the received signal is processed faster than in the sequentially executed cancellation process.

$$y'(k, l) = y(k, l) - \sum_{i=1}^{N_{cancel}} h_{e,i}^{(2nd)}(R_i^{(est)}(k, l))x_i^{(data)}(R_i^{(data)}(k, l)) \quad (15)$$

In the present example, $h_{e,i}^{(2nd)}$ and $x_i^{(data)}$ in mathematical formula 15 are each 0 when the RE identified by the subcarrier number k and the symbol time number l is different from any of the $N_{data}$ number of cancellation target REs in the i-th interference cell.

As described above, the estimation target REs are the same between the interference cell channel estimation unit 221 and the interference cell channel re-estimation unit 226 in the first embodiment. The estimation target REs may be different between the interference cell channel estimation unit 221 and the interference cell channel re-estimation unit 226. Further, $N_{est}$ representing the number of estimation target REs may be different between the interference cell channel estimation unit 221 and the interference cell channel re-estimation unit 226.

The interference cell channel re-estimation unit 226 may estimate the channel based on the received signal for the $N_{RS}$ number of CRS-allocated REs in addition to the received signal for the $N_{data}$ number of cancellation target REs. In this case, the interference cell channel re-estimation unit 226 may estimate the channel $h_{e,i}^{(2nd)}$ for the $N_{est}$ number of estimation target REs in the i-th interference cell based on mathematical formula 16.

$$h_{e,i}^{(2nd)} = W_i^{(2nd,CRS,data)}(X_i^{(CRS,data)})^H y^{(CRS,data)} \quad (16)$$

Herein, $y^{(CRS,data)}$ is expressed by mathematical formula 17. The element in the s-th row of $y^{(CRS,data)}$ represents the received signal for the s-th RE in the $N_{RS}$ number of CRS-allocated REs and the $N_{data}$ number of cancellation target REs. Herein, s represents an integer ranging from 1 to $N_{RS}+N_{data}$.

$$y^{(CRS,data)} = \begin{bmatrix} y^{(CRS)}(1) \\ y^{(CRS)}(2) \\ \vdots \\ y^{(CRS)}(N_{RS}) \\ y^{(data)}(1) \\ y^{(data)}(2) \\ \vdots \\ y^{(data)}(N_{data}) \end{bmatrix} \quad (17)$$

$x_i^{(CRS, data)}$ is an $(N_{RS}+N_{data})$-row, $(N_{RS}+N_{data})$-column diagonal matrix expressed by mathematical formula 18.

$$X_i^{(CRS,data)} = \begin{bmatrix} x_i^{(CRS)}(1) & & & & & & \\ & x_i^{(CRS)}(2) & & & & 0 & \\ & & \ddots & & & & \\ & & & x_i^{(CRS)}(N_{RS}) & & & \\ & & & & x_i^{(data)}(1) & & \\ & 0 & & & & x_i^{(data)}(2) & \\ & & & & & & \ddots \\ & & & & & & & x_i^{(data)}(N_{data}) \end{bmatrix} \quad (18)$$

$W_i^{(2nd,CRS,data)}$ represents an $N_{est}$-row, $(N_{RS}+N_{data})$-column channel estimation weight matrix for the i-th interference cell. The row vector of the p-th row of the channel estimation weight matrix $W_i^{(2nd,CRS,data)}$ represents the weight vector for the p-th estimation target RE in the $N_{est}$ number of estimation target REs. The element in the s-th column of the weight vector represents the weight coefficient for the s-th RE in the $N_{RS}$ number of CRS-allocated REs and the $N_{data}$ number of cancellation target REs used to estimate the channel. According to this configuration, the number of REs used to estimate the channel is increased, and thus the accuracy of channel estimation is enhanced.

Second Embodiment

The radio communication system 1 according to a second embodiment will now be described. The radio communication system 1 according to the second embodiment is different from the radio communication system 1 according to the first embodiment in that the mobile station 20 estimates the channel in accordance with a system determined in accordance with the number of antennas used to transmit the interference signal. The following description will focus on this difference.

Figure 12:
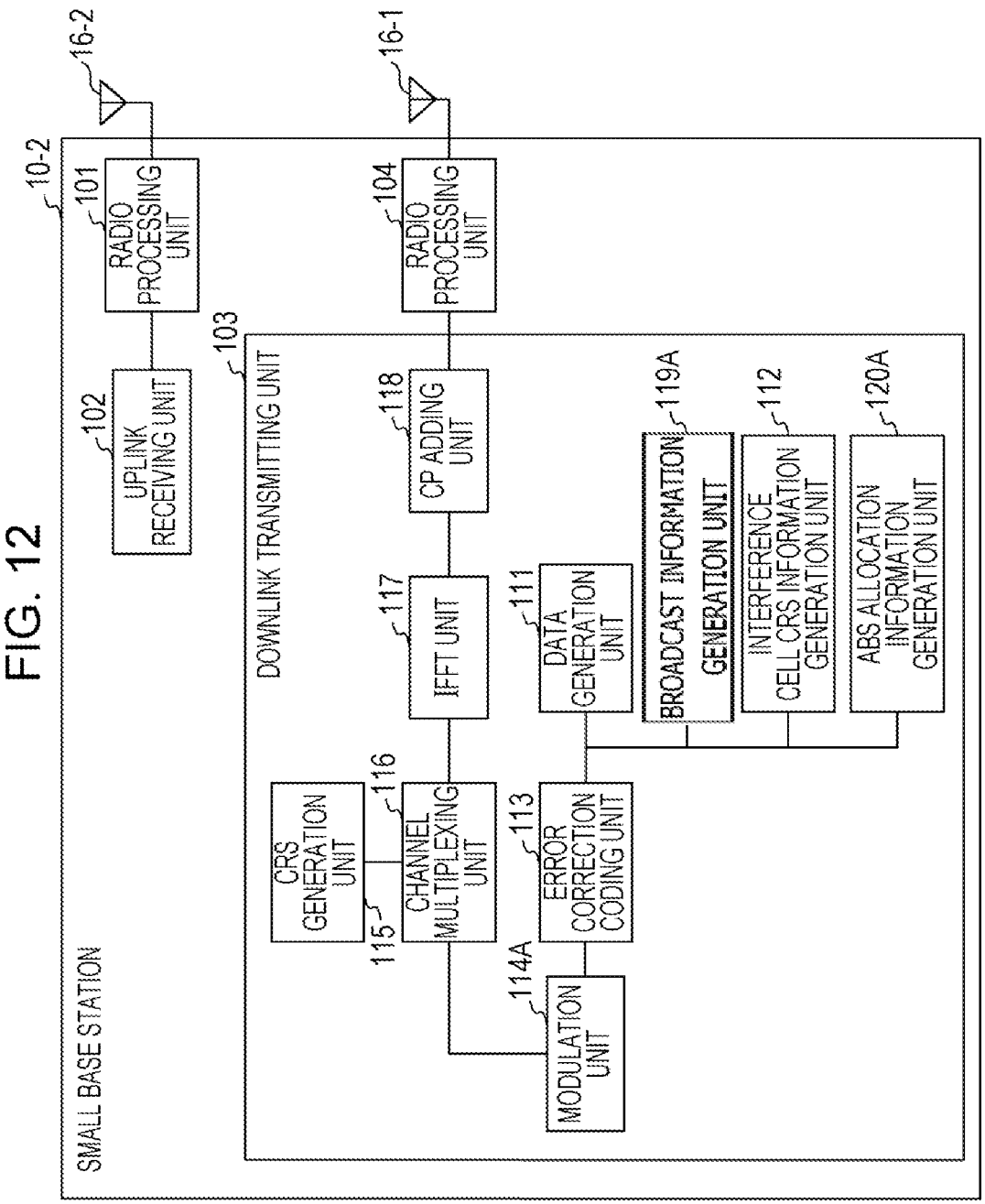
FIG. 12 is a block diagram illustrating an example of functions of the small base station according to a second embodiment.

As exemplified in FIG. 12, the downlink transmitting unit 103 of the small base station 10-2 according to the second embodiment includes a broadcast information generation unit 119A and an ABS allocation information generation unit 120A in addition to the functions of the downlink transmitting unit 103 in FIG. 6. Further, as exemplified in FIG. 12, the downlink transmitting unit 103 includes a modulation unit 114A in place of the modulation unit 114 in FIG. 6.

The broadcast information generation unit 119A generates broadcast information. In the present example, the broadcast information includes a master information block (MIB). The MIB includes the frame number (system frame number: SFN) of the radio frame and the system bandwidth, for example. A signal representing the broadcast information may be described as the broadcast signal. In the present example, the interference signal is the broadcast signal. The cancellation target REs are therefore the REs allocated to the broadcast signal.

The ABS allocation information generation unit 120A generates ABS allocation information. In the present example, the ABS allocation information includes information for identifying the subframe allocated to the ABS in the radio area WA-1. The small base station 10-2 may previously hold the ABS allocation information. Further, the small base station 10-2 may receive the ABS allocation information from the control station connected to the communication network NW or from another base station 10, for example. The ABS allocation information may be transmitted to the mobile station 20 as the RRC information, for example.

The error correction coding unit 113 performs error correction coding on the generated data and interference cell CRS information, the broadcast information generated by the broadcast information generation unit 119A, and the ABS allocation information generated by the ABS allocation information generation unit 120A.

In the present example, the macro base station 10-1 has functions similar to those of the small base station 10-2 except that the macro base station 10-1 transmits the ABS in the subframe identified by the ABS allocation information. The macro base station 10-1 does not have to use the ABS allocation information generation unit 120A.

When communication traffic exceeds a threshold, the macro base station 10-1 may transmit, in place of the ABS, a subframe which is identified by the ABS allocation information, and in which REs different from the REs allocated to the CRS are allocated to the data.

Figure 13:
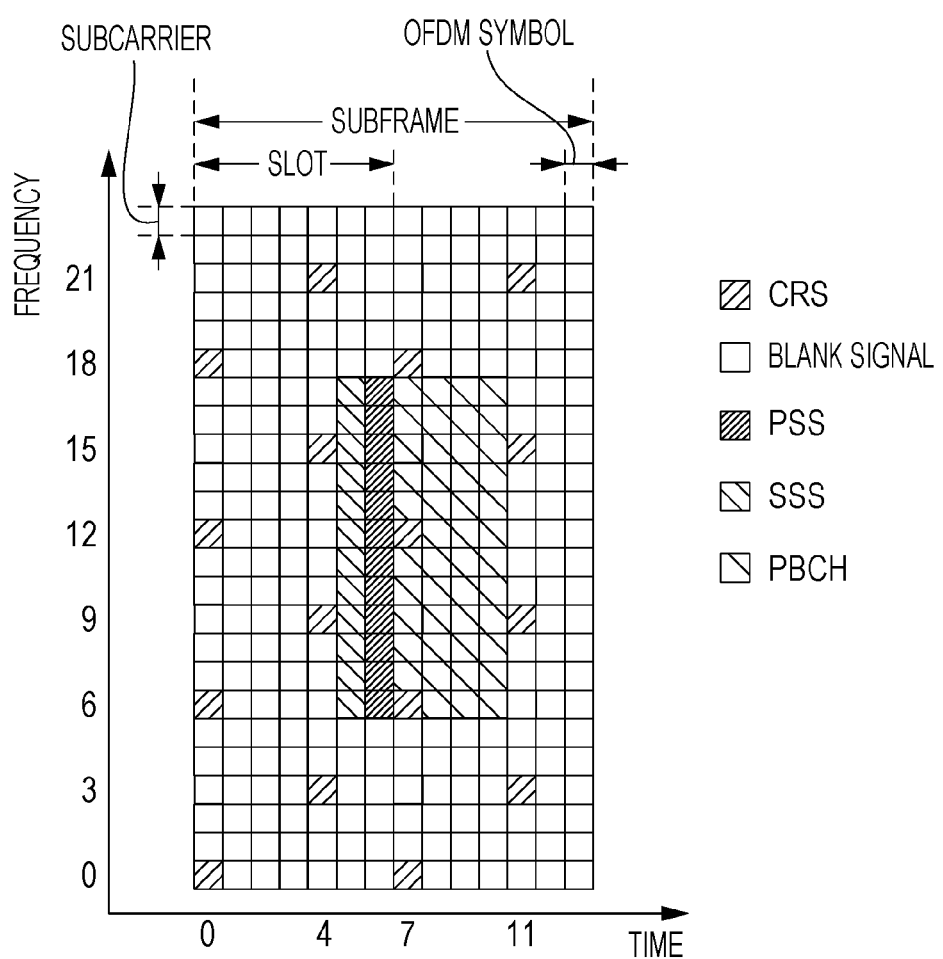
FIG. 13 is an explanatory diagram illustrating an example of allocation of a radio resource in an ABS in downlink according to the LTE system.

FIG. 13 illustrates an example of allocation of the radio resource in the ABS in downlink according to the LTE system. It is assumed in FIG. 13 that the normal CP is used, and that the number of transmitting antennas is 1. The allocation of the radio resource may be different from that in FIG. 13.

In the ABS of the present example, REs are allocated to the CRS, the PSS, the SSS, and the PBCH, as illustrated in FIG. 13. In the ABS of the present example, the REs of the ABS different from the REs allocated to the CRS, the PSS, the SSS, and the PBCH are allocated to the blank signal.

In addition to the functions of the modulation unit 114 in FIG. 6, the modulation unit 114A performs a coding process according to a transmission diversity system determined in accordance with transmitting antenna number. The transmitting antenna number refers to the number of antennas in the antennas 16-1 to 16-P used to transmit the radio signal. In the present example, the modulation unit 114A performs the coding process on the broadcast information. The modulation unit 114A may perform the coding process on information different from the broadcast information.

The small base station 10-2 may set the transmitting antenna number based on the number of mobile stations 20 covered by the small base station 10-2. Further, the small base station 10-2 may set the transmitting antenna number based on the quality of communication between the small base station 10-2 and the mobile stations 20 covered by the small base station 10-2.

When the transmitting antenna number is set to 1, the modulation unit 114A outputs the modulated data to the channel multiplexing unit 116 without executing the coding process on the modulated data.

When the transmitting antenna number is set to 2, the modulation unit 114A executes a coding process according to a space frequency block coding (SFBC) system on the modulated data. The modulation unit 114A outputs the data subjected to the coding process to the channel multiplexing unit 116. In the present example, the (2b−1)-th modulation symbol $S_{2b-1}$ and the 2b-th modulation symbol $S_{2b}$ in the $N_{data}$ number of modulation symbols form one SFBC pair. Herein, b represents an integer ranging from 1 to $N_{pair}$. In the present example, $N_{pair}$ is equal to $N_{data}/2$.

When the transmitting antenna number is set to 2, the modulation unit 114A executes the coding process such that the modulation symbols $S_{2b-1}$ and $S_{2b}$ are transmitted from the first and second antennas, respectively, in the first RE common to the antennas, for example. The modulation unit 114A further executes the coding process such that modulation symbols $-S_{2b}^*$ and $S_{2b-1}^*$ are transmitted from the first and second antennas, respectively, in the second RE common to the antennas. A* represents a complex conjugate of A. In this case, therefore, the $N_{pair}$ number of SFBC pairs are transmitted in the $N_{data}$ number of REs allocated to the broadcast signal.

When the transmitting antenna number is set to 4, the modulation unit 114A executes a coding process according to an SFBC+FSTD system on the modulated data. The SFBC+FSTD system is a system combining the SFBC system and an FSTD system. FSTD is an abbreviation for frequency switched transmit diversity. The modulation unit 114A outputs the data subjected to the coding process to the channel multiplexing unit 116. In the present example, the (4c−3)-th to 4c-th four modulation symbols $S_{4c-3}$, $S_{4c-2}$, $S_{4c-1}$, and $S_{4c}$ in the $N_{data}$ number of modulation symbols form two SFBC pairs. Herein, c represents an integer ranging from 1 to $N_{pair}/2$.

When the transmitting antenna number is set to 4, the modulation unit 114A executes the coding process such that the modulation symbols $S_{4c-3}$ and $S_{4c-2}$ are transmitted from the first and third antennas, respectively, in the first RE common to the antennas, for example. The modulation unit 114A further executes the coding process such that modulation symbols $-S_{4c-2}^*$ and $S_{4c-3}^*$ are transmitted from the first and third antennas, respectively, in the second RE common to the antennas.

In addition, the modulation unit 114A executes the coding process such that the modulation symbols $S_{4c-1}$ and $S_{4c}$ are transmitted from the second and fourth antennas, respectively, in the third RE common to the antennas. The modulation unit 114A further executes the coding process such that modulation symbols $-S_{4c}^*$ and $S_{4c-1}^*$ are transmitted from the second and fourth antennas, respectively, in the fourth RE common to the antennas. In this case, therefore, the $N_{pair}$ number of SFBC pairs are transmitted in the $N_{data}$ number of REs allocated to the broadcast signal.

Figure 14:
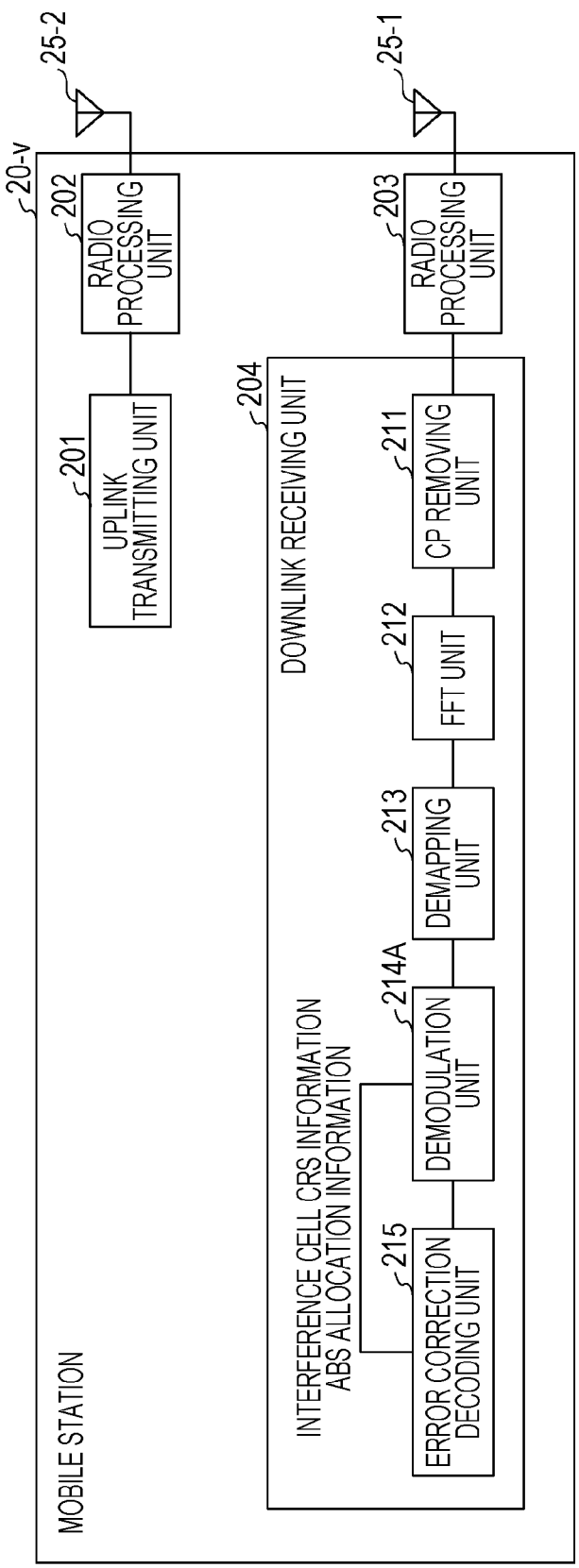
FIG. 14 is a block diagram illustrating an example of functions of the mobile station according to the second embodiment.

As exemplified in FIG. 14, the downlink receiving unit 204 of the mobile station 20-$v$ according to the second embodiment includes a demodulation unit 214A in place of the demodulation unit 214 in FIG. 9. In the present example, the error correction decoding unit 215 informs the demodulation unit 214A of the ABS allocation information and the interference cell CRS information in the information or data subjected to the error correction decoding.

Figure 15:
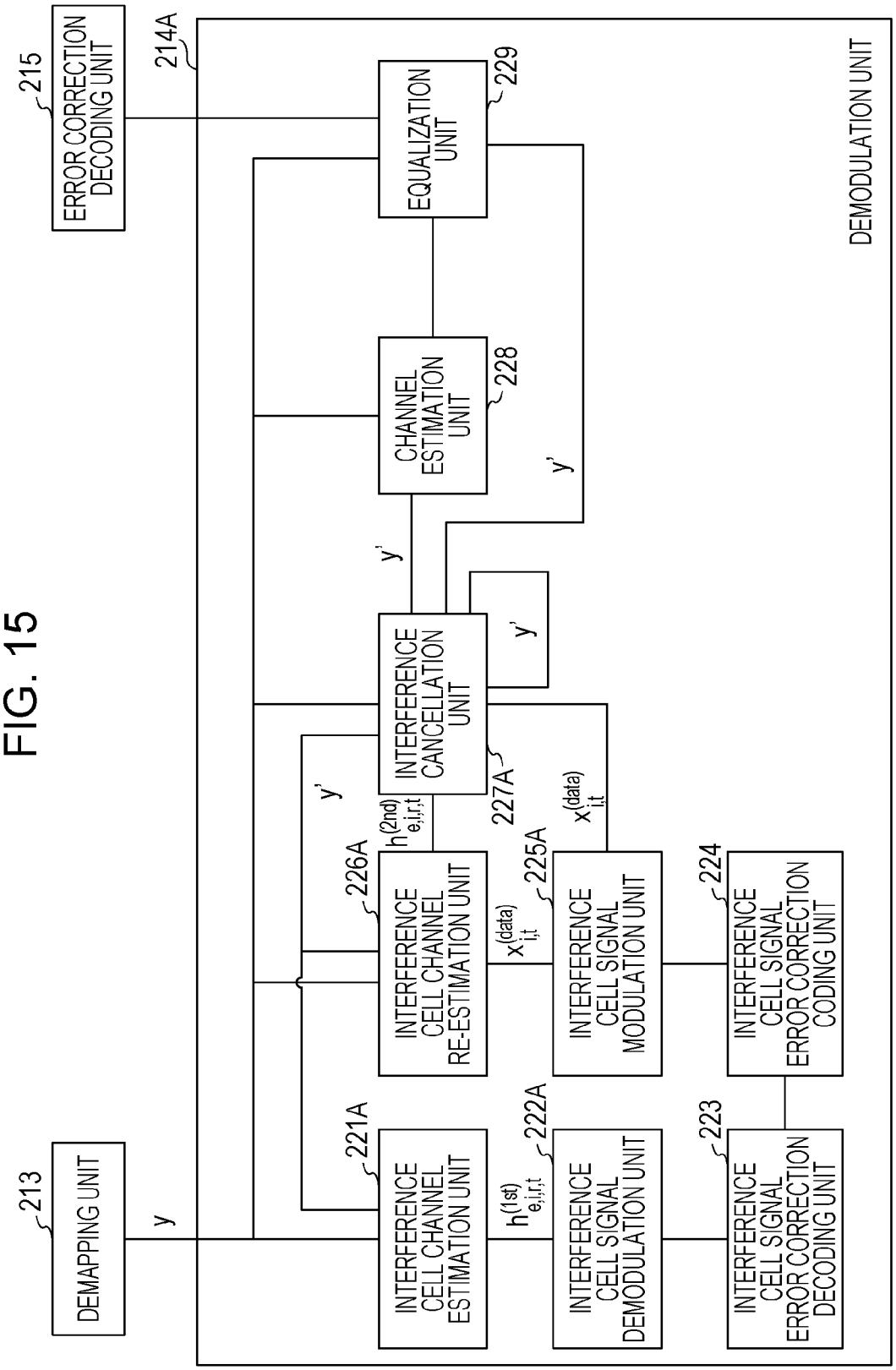
FIG. 15 is a block diagram illustrating an example of functions of a demodulation unit in FIG. 14.

As exemplified in FIG. 15, the demodulation unit 214A according to the second embodiment has functions similar to those of the demodulation unit 214 in FIG. 10 except for first to fifth differences. The first difference is that the demodulation unit 214A includes an interference cell channel estimation unit 221A in place of the interference cell channel estimation unit 221 in FIG. 10. The second difference is that the demodulation unit 214A includes an interference cell signal demodulation unit 222A in place of the interference cell signal demodulation unit 222 in FIG. 10. The third difference is that the demodulation unit 214A includes an interference cell signal modulation unit 225A in place of the interference cell signal modulation unit 225 in FIG. 10. The fourth difference is that the demodulation unit 214A includes an interference cell channel re-estimation unit 226A in place of the interference cell channel re-estimation unit 226 in FIG. 10. The fifth difference is that the demodulation unit 214A includes an interference cancellation unit 227A in place of the interference cancellation unit 227 in FIG. 10.

The interference cell channel estimation unit 221A has functions similar to those of the interference cell channel estimation unit 221 except for the following difference. The difference is that the interference cell channel estimation unit 221A estimates the channel for each of combinations of the antennas 16 used for transmission by the base station 10 and the antennas 25 used for reception by the mobile station 20 in the i-th interference cell.

In the present example, the interference cell channel estimation unit 221A calculates an estimated value $h_{e,i,r,t}^{(1st)}$ of the channel based on the transmitting antenna number included in the interference cell CRS information and the input value of the received signal for the CRS-allocated REs in the i-th interference cell. Herein, $h_{e,i,r,t}^{(1st)}$ represents the estimated value of the channel between the t-th transmitting antenna 16 and the r-th receiving antenna 25 in the i-th interference cell. Further, r represents an integer ranging from 1 to receiving antenna number. The receiving antenna number refers to the number of antennas used for reception by the mobile station 20. Further, t represents an integer ranging from 1 to the transmitting antenna number.

The interference cell signal demodulation unit 222A demodulates the received signal for the $N_{data}$ number of cancellation target REs in the i-th interference cell based on the channel estimated by the interference cell channel estimation unit 221A and the transmitting antenna number included in the interference cell CRS information.

In the present example, in addition to the functions of the interference cell signal demodulation unit 222, the interference cell signal demodulation unit 222A performs a decoding process corresponding to the coding process according to the transmission diversity system determined in accordance with the transmitting antenna number. For example, when the transmitting antenna number is 2, the interference cell signal demodulation unit 222A performs a decoding process corresponding to the coding process according to the SFBC system. Further, when the transmitting antenna number is 4, the interference cell signal demodulation unit 222A performs a decoding process corresponding to the coding process according to the SFBC+FSTD system.

In addition to the functions of the interference cell signal modulation unit 225, the interference cell signal modulation unit 225A performs a coding process according to the transmission diversity system determined in accordance with the transmitting antenna number. For example, when the transmitting antenna number is 2, the interference cell signal modulation unit 225A performs a coding process according to the SFBC system. Further, when the transmitting antenna number is 4, the interference cell signal modulation unit 225A performs a coding process according to the SFBC+FSTD system. Thereby, the interference cell signal modulation unit 225A generates the interference signal transmitted by the base station 10.

The interference cell channel re-estimation unit 226A has functions similar to those of the interference cell channel re-estimation unit 226 except for the following first and second differences. The first difference is that the interference cell channel re-estimation unit 226A re-estimates the channel for each of the combinations of the antennas 16 used for transmission by the base station 10 and the antennas 25 used for reception by the mobile station 20 in the i-th interference cell. The second difference is that the interference cell channel re-estimation unit 226A performs an estimation process according to the transmission diversity system determined in accordance with the transmitting antenna number. In the present example, the interference cell channel re-estimation unit 226A performs an estimation process according to the transmission diversity system determined in accordance with the transmitting antenna number included in the interference cell CRS information.

When Transmitting Antenna Number is 1

When the transmitting antenna number is 1, the interference cell channel re-estimation unit 226A re-estimates the channel with mathematical formula 19 in place of mathematical formula 10.

$$h_{e,i,r,t}^{(2nd)} = W_{i,r,t}^{(2nd)} (X_{i,t}^{(data)})^H y_r^{(data)} \quad (19)$$

Herein, $h_{e,i,r,t}^{(2nd)}$ represents the estimated value of the channel between the t-th transmitting antenna 16 and the r-th receiving antenna 25 in the i-th interference cell. Since the transmitting antenna number is herein assumed to be 1, t represents 1. Further, $h_{e,i,r,t}^{(2nd)}$ is expressed by mathematical formula 20. The element in the p-th row of $h_{e,i,r,t}^{(2nd)}$ represents the channel for the p-th estimation target RE in the $N_{est}$ number of estimation target REs.

$$h_{e,i,r,t}^{(2nd)} = \begin{bmatrix} h_{e,i,r,t}^{(2nd)}(1) \\ h_{e,i,r,t}^{(2nd)}(2) \\ \vdots \\ h_{e,i,r,t}^{(2nd)}(N_{est}) \end{bmatrix} \quad (20)$$

Further, $y_r^{(data)}$ represents the received signal received by the r-th receiving antenna 25. Herein, $y_r^{(data)}$ is expressed by mathematical formula 21. The element in the w-th row of $y_r^{(data)}$ represents the received signal for the w-th cancellation target RE in the $N_{data}$ number of cancellation target REs.

$$y_r^{(data)} = \begin{bmatrix} y_r^{(data)}(1) \\ y_r^{(data)}(2) \\ \vdots \\ y_r^{(data)}(N_{data}) \end{bmatrix} \quad (21)$$

Further, $X_{i,t}^{(data)}$ represents the transmitted signal transmitted by the t-th transmitting antenna 16 in the i-th interference cell. $X_{i,t}^{(data)}$ is an $N_{data}$-row, $N_{data}$-column diagonal matrix expressed by mathematical formula 22. Herein, $x_i(w)$ represents the interference signal allocated to the w-th cancellation target RE in the $N_{data}$ number of cancellation target REs used to estimate the channel and generated by the interference cell signal modulation unit 225A. Further, an equation is expressed as $E\{|x_i(1)|^2\}=E\{|x_i(2)|^2\}=\ldots=E\{|x_i(N_{data})|^2\}=E\{|x_i|^2\}$.

$$X_{i,t}^{(data)} = \begin{bmatrix} x_i(1) & & & 0 \\ & x_i(2) & & \\ & & \ddots & \\ 0 & & & x_i(N_{data}) \end{bmatrix} \quad (22)$$

Further, $W_{i,r,t}^{(2nd)}$ represents an $N_{est}$-row, $N_{data}$-column channel estimation weight matrix for the channel between the r-th receiving antenna 25 and the t-th transmitting antenna 16 in the i-th interference cell. The row vector of the p-th row of the channel estimation weight matrix $W_{i,r,t}^{(2nd)}$ represents the weight vector for the p-th estimation target RE in the $N_{est}$ number of estimation target REs. The element in the w-th column of the weight vector represents the weight coefficient for the w-th cancellation target RE in the $N_{data}$ number of cancellation target REs used to estimate the channel.

When Transmitting Antenna Number is 2

When the transmitting antenna number is 2, the interference cell channel re-estimation unit 226A re-estimates the channel with mathematical formulae 23 and 24 in place of mathematical formula 22. $(A)_{a,b}$ represents the element in row a and column b of matrix A. Herein, a represents an integer ranging from 1 to $N_{data}$. Further, b represents an integer ranging from 1 to $N_{pair}$.

$$\left(X_{i,1}^{(data)}\right)_{a,b} = \begin{cases} x_i(2b-1) & \text{where } a = 2b-1 \\ x_i(2b) & \text{where } a = 2b \\ 0 & \text{otherwise} \end{cases} \quad (23)$$

$$\left(X_{i,2}^{(data)}\right)_{a,b} = \begin{cases} -x_i^*(2b) & \text{where } a = 2b-1 \\ x_i^*(2b-1) & \text{where } a = 2b \\ 0 & \text{otherwise} \end{cases} \quad (24)$$

$X_{i,t}^{(data)}$ represents the transmitted signal transmitted by the t-th transmitting antenna 16 in the i-th interference cell. In this case, t represents an integer of 1 or 2. $X_{i,t}^{(data)}$ is an $N_{data}$-row, $N_{pair}$-column matrix.

As indicated in mathematical formula 23, $X_{i,1}^{(data)}$ includes $x_i(2b-1)$ and $x_i(2b)$ as the elements in the $(2b-1)$-th row and the 2b-th row in column b, respectively, and 0 as the other elements in column b. As indicated in mathematical formula 24, $X_{i,2}^{(data)}$ includes $-x_i^*(2b)$ and $x_i^*(2b-1)$ as the elements in the $(2b-1)$-th row and the 2b-th row in column b, respectively, and 0 as the other elements in column b.

In this case, $W_{i,r,t}^{(2nd)}$ in mathematical formula 19 represents an $N_{est}$-row, $N_{pair}$-column channel estimation weight matrix for the channel between the r-th receiving antenna 25 and the t-th transmitting antenna 16 in the i-th interference cell. The row vector of the p-th row of the channel estimation weight matrix $W_{i,r,t}^{(2nd)}$ represents the weight vector for the p-th estimation target RE in the $N_{est}$ number of estimation target REs. The element of the weight vector represents the weight coefficient for the cancellation target REs used to estimate the channel.

When Transmitting Antenna Number is 4

When the transmitting antenna number is 4, the interference cell channel re-estimation unit 226A re-estimates the channel with mathematical formulae 25 to 28 in place of mathematical formula 22. Herein, c represents an integer ranging from 1 to $N_{pair}/2$.

$$\left(X_{i,1}^{(data)}\right)_{a,c} = \begin{cases} x_i(4c-3) & \text{where } a = 4c-3 \\ x_i(4c-2) & \text{where } a = 4c-2 \\ 0 & \text{otherwise} \end{cases} \quad (25)$$

$$\left(X_{i,3}^{(data)}\right)_{a,c} = \begin{cases} -x_i^*(4c-2) & \text{where } a = 4c-3 \\ x_i^*(4c-3) & \text{where } a = 4c-2 \\ 0 & \text{otherwise} \end{cases} \quad (26)$$

$$\left(X_{i,2}^{(data)}\right)_{a,c} = \begin{cases} x_i(4c-1) & \text{where } a = 4c-1 \\ x_i(4c) & \text{where } a = 4c \\ 0 & \text{otherwise} \end{cases} \quad (27)$$

$$\left(X_{i,4}^{(data)}\right)_{a,c} = \begin{cases} -x_i^*(4c) & \text{where } a = 4c-1 \\ x_i^*(4c-1) & \text{where } a = 4c \\ 0 & \text{otherwise} \end{cases} \quad (28)$$

$X_{i,t}^{(data)}$ represents the transmitted signal transmitted by the t-th transmitting antenna 16 in the i-th interference cell. In this case, t represents an integer ranging from 1 to 4. $X_{i,t}^{(data)}$ is an $N_{data}$-row, $N_{pair}/2$-column matrix.

As indicated in mathematical formula 25, $X_{i,1}^{(data)}$ includes $x_i(4c-3)$ and $x_i(4c-2)$ as the elements in the $(4c-3)$-th row and the $(4c-2)$-th row in column c, respectively, and 0 as the other elements in column c. As indicated in mathematical formula 26, $X_{i,3}^{(data)}$ includes $-x_i^*(4c-2)$ and $x_i^*(4c-3)$ as the elements in the $(4c-3)$-th row and the $(4c-2)$-th row in column c, respectively, and 0 as the other elements in column c.

As indicated in mathematical formula 27, $X_{i,2}^{(data)}$ includes $x_i(4c-1)$ and $x_i(4c)$ as the elements in the $(4c-1)$-th row and the 4c-th row in column c, respectively, and 0 as the other elements in column c. As indicated in mathematical formula 28, $X_{i,4}^{(data)}$ includes $-x_i^*(4c)$ and $x_i^*(4c-1)$ as the elements in the $(4c-1)$-th row and the 4c-th row in column c, respectively, and 0 as the other elements in column c.

The interference cancellation unit 227A has functions similar to those of the interference cancellation unit 227 except for the following first and second differences. The first difference is that the interference cancellation unit 227A calculates a provisional value $y_r'$ of the received signal for each of the antennas 25 used for reception by the mobile station 20. The second difference is that the interference cancellation unit 227A performs a cancellation process according to the transmission diversity system determined in accordance with the transmitting antenna number.

In the present example, the interference cancellation unit 227A performs a cancellation process according to the transmission diversity system determined in accordance with the transmitting antenna number included in the interference cell CRS information. Further, in the present example, the interference cancellation unit 227A calculates the provisional value $y_r'$ of the received signal for each of the receiving antennas 25 based on the input value $y_r$ of the received signal, the estimated channel $h_{e,i,r,t}^{(2nd)}$, and the generated interference signal $x_i$.

When Transmitting Antenna Number is 1

When the transmitting antenna number is 1, the interference cancellation unit 227A calculates the provisional value $y_r'$ of the received signal for the r-th receiving antenna 25 with mathematical formula 29 in place of mathematical formula 14.

$$y_r'(k,l) = y_r(k,l) - h_{e,i,r,1}^{(2nd)}(R_i^{(est)}(k,l))x_i(R_i^{(data)}(k,l)) \quad (29)$$

When Transmitting Antenna Number is 2

When the transmitting antenna number is 2, the interference cancellation unit 227A calculates the provisional value $y_r'$ of the received signal for the r-th receiving antenna 25 with mathematical formulae 30 and 31 in place of mathematical formula 14.

$$y_r'(k,l) = y_r(k,l) - h_{e,i,r,1}^{(2nd)}(R_i^{(est)}(k,l))x_i(R_i^{(data)}(k,l)) + \\ h_{e,i,r,2}^{(2nd)}(R_i^{(est)}(k,l))x_i^*(R_i^{(data)}(k,l)+1) \quad (30)$$

$$y_r'(k,l) = y_r(k,l) - h_{e,i,r,1}^{(2nd)}(R_i^{(est)}(k,l))x_i(R_i^{(data)}(k,l)) - \\ h_{e,i,r,2}^{(2nd)}(R_i^{(est)}(k,l))x_i^*(R_i^{(data)}(k,l)-1) \quad (31)$$

In the present example, when an equation $R_i^{(data)}(k,l)=2b-1$ holds, the interference cancellation unit 227A calculates the provisional value $y_r'$ of the received signal for the r-th receiving antenna 25 with mathematical formula 30. As described above, b represents an integer ranging from 1 to $N_{pair}$. Further, in the present example, when an equation $R_i^{(data)}(k,l)=2b$ holds, the interference cancellation unit 227A calculates the provisional value $y_r'$ of the received signal for the r-th receiving antenna 25 with mathematical formula 31.

When Transmitting Antenna Number is 4

When the transmitting antenna number is 4, the interference cancellation unit 227A calculates the provisional value $y_r'$ of the received signal for the r-th receiving antenna 25 with mathematical formulae 32 to 35 in place of mathematical formula 14.

$$y_r'(k,l) = y_r(k,l) - h_{e,i,r,1}^{(2nd)}(R_i^{(est)}(k,l))x_i(R_i^{(data)}(k,l)) + \\ h_{e,i,r,3}^{(2nd)}(R_i^{(est)}(k,l))x_i^*(R_i^{(data)}(k,l)+1) \quad (32)$$

$$y_r'(k,l) = y_r(k,l) - h_{e,i,r,1}^{(2nd)}(R_i^{(est)}(k,l))x_i(R_i^{(data)}(k,l)) - \\ h_{e,i,r,3}^{(2nd)}(R_i^{(est)}(k,l))x_i^*(R_i^{(data)}(k,l)-1) \quad (33)$$

$$y_r'(k,l) = y_r(k,l) - h_{e,i,r,2}^{(2nd)}(R_i^{(est)}(k,l))x_i(R_i^{(data)}(k,l)) + \\ h_{e,i,r,4}^{(2nd)}(R_i^{(est)}(k,l))x_i^*(R_i^{(data)}(k,l)+1) \quad (34)$$

-continued $$y_r'(k,l) = y_r(k,l) - h_{e,i,r,2}^{(2nd)}(R_i^{(est)}(k,l))x_i(R_i^{(data)}(k,l)) - \\ h_{e,i,r,4}^{(2nd)}(R_i^{(est)}(k,l))x_i^*(R_i^{(data)}(k,l)-1) \quad (35)$$

In the present example, when an equation $R_i^{(data)}(k,l)=4c-3$ holds, the interference cancellation unit 227A calculates the provisional value $y_r'$ of the received signal for the r-th receiving antenna 25 with mathematical formula 32. As described above, c represents an integer ranging from 1 to $N_{pair}/2$. Further, in the present example, when an equation $R_i^{(data)}(k,l)=4c-2$ holds, the interference cancellation unit 227A calculates the provisional value $y_r'$ of the received signal for the r-th receiving antenna 25 with mathematical formula 33.

Further, in the present example, when an equation $R_i^{(data)}(k,l)=4c-1$ holds, the interference cancellation unit 227A calculates the provisional value $y_r'$ of the received signal for the r-th receiving antenna 25 with mathematical formula 34. Further, in the present example, when an equation $R_i^{(data)}(k,l)=4c$ holds, the interference cancellation unit 227A calculates the provisional value $y_r'$ of the received signal for the r-th receiving antenna 25 with mathematical formula 35.

The radio communication system 1 according to the second embodiment thus operates similarly to the radio communication system 1 according to the first embodiment. Accordingly, the mobile station 20-1 according to the second embodiment exhibits functions and effects similar to those of the mobile station 20-1 according to the first embodiment.

The transmission diversity system changes in accordance with the number of antennas 16 used to transmit the interference signal. The change in the transmission diversity system also changes the signal transmitted by each of the antennas 16.

As described above, the first estimation process in the mobile station 20-1 according to the second embodiment conforms to the system determined in accordance with the number of antennas 16 used to transmit the interference signal. The interference cell channel re-estimation unit 226A according to the second embodiment is therefore capable of estimating the channel for the radio area WA-1 with high accuracy.

Similarly, the cancellation process in the mobile station 20-1 according to the second embodiment conforms to the system determined in accordance with the number of antennas 16 used to transmit the interference signal. The interference cancellation unit 227A according to the second embodiment is therefore capable of enhancing the reception quality of the desired signal transmitted in the radio area WA-2.

The PBCH is allocated to the radio resource also in the ABS. As described above, the mobile station 20-1 according to the second embodiment uses the broadcast signal transmitted via the PBCH as the interference signal. According to this configuration, the reception quality of the desired signal transmitted in the radio area WA-2 is enhanced during the period in which the ABS is transmitted in the radio area WA-1.

Arbitrary combinations of the above-described embodiments and modified examples may be adopted as other modified examples of the above-described embodiments. Although the above-described devices or methods are applied to downlink communication in the above-described embodiments, the devices or methods may also be applied to uplink communication in place of or in addition to the downlink communication.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A receiving device comprising:
a processor configured to:
execute a first demodulation process on a second signal transmitted in a second radio area different from a first radio area in which a first signal as a desired signal is transmitted,
execute a first estimation process of estimating a channel for the second radio area based on an execution result of the first demodulation process, and
execute a cancellation process of cancelling a component from a received signal based on the estimated channel, the component being attributed to the second signal transmitted in the second radio area, the cancellation process including generating a replica signal of the second signal based on a product of the channel estimated by the first estimation process and the execution result of the first demodulation process and subtracting the generated replica signal from the received signal,
wherein the receiving device executes a second demodulation process on the desired signal based on an execution result of the cancellation process.

2. The receiving device according to claim 1, wherein the processor is further configured to
execute a second estimation process of estimating the channel for the second radio area based on a known signal transmitted in the second radio area,
wherein the first demodulation process is executed based on the channel estimated by the second estimation process.

3. The receiving device according to claim 1, wherein the first estimation process conforms to a system determined in accordance with number of antennas used to transmit the second signal.

4. The receiving device according to claim 1, wherein the cancellation process conforms to a system determined in accordance with number of antennas used to transmit the second signal.

5. The receiving device according to claim 1, wherein the second signal is transmitted via a physical broadcast channel.

6. A receiving method comprising:
executing, by a processor, a first demodulation process on a second signal transmitted in a second radio area different from a first radio area in which a first signal as a desired signal is transmitted;
executing a first estimation process of estimating a channel for the second radio area based on an execution result of the first demodulation process;
executing a cancellation process of cancelling a component from a received signal based on the estimated channel, the component being attributed to the second signal transmitted in the second radio area, the cancellation process including generating a replica signal of the second signal based on a product of the channel estimated by the first estimation process and the execution result of the first demodulation process and subtracting the generated replica signal from the received signal; and
executing a second demodulation process on the desired signal based on an execution result of the cancellation process.

7. The receiving method according to claim 6, further comprising:
executing a second estimation process of estimating the channel for the second radio area based on a known signal transmitted in the second radio area,
wherein the first demodulation process is executed based on the channel estimated by the second estimation process.

8. The receiving method according to claim 6, wherein the first estimation process conforms to a system determined in accordance with number of antennas used to transmit the second signal.

9. The receiving method according to claim 6, wherein the cancellation process conforms to a system determined in accordance with number of antennas used to transmit the second signal.

10. The receiving method according to claim 6, wherein the second signal is transmitted via a physical broadcast channel.

11. A radio communication system comprising:
a transmitting device including:
a transmitting unit configured to transmit a first signal as a desired signal in a first radio area; and
a receiving device including:
a processor configured to:
execute a first demodulation process on a second signal transmitted in a second radio area different from the first radio area,
execute a first estimation process of estimating a channel for the second radio area based on an execution result of the first demodulation process, and
execute a cancellation process of cancelling a component from a received signal based on the estimated channel, the component being attributed to the second signal transmitted in the second radio area, the cancellation process including generating a replica signal of the second signal based on a product of the channel estimated by the first estimation process and the execution result of the first demodulation process and subtracting the generated replica signal from the received signal,
wherein the receiving device executes a second demodulation process on the desired signal based on an execution result of the cancellation process.

12. The radio communication system according to claim 11, wherein the processor of the receiving device is further configured to
execute a second estimation process of estimating the channel for the second radio area based on a known signal transmitted in the second radio area,
wherein the first demodulation process on the second signal is executed based on the channel estimated by the second estimation process.

13. The radio communication system according to claim 11, wherein the first estimation process conforms to a system determined in accordance with number of antennas used to transmit the second signal.

14. The radio communication system according to claim 11, wherein the cancellation process conforms to a system determined in accordance with number of antennas used to transmit the second signal.

15. The radio communication system according to claim 11, wherein the second signal is transmitted via a physical broadcast channel.

\* \* \* \* \*